United States Patent
Isowaki et al.

(10) Patent No.: US 9,275,660 B1
(45) Date of Patent: Mar. 1, 2016

(54) MAGNETIC HEAD HAVING FIRST MAGNETIC SHIELD, STACK, SIDE SHIELD, ANTIFERROMAGNETIC LAYER, AND SECOND MAGNETIC SHIELD, MAGNETIC HEAD ASSEMBLY, MAGNETIC RECORDING AND REPRODUCING APPARATUS, AND MANUFACTURING METHOD OF MAGNETIC HEAD

(71) Applicant: KABUSHIKI KAISHA TOSHIBA, Tokyo (JP)

(72) Inventors: Yousuke Isowaki, Kanagawa (JP); Kenichiro Yamada, Tokyo (JP); Masayuki Takagishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/817,468

(22) Filed: Aug. 4, 2015

(30) Foreign Application Priority Data

Oct. 1, 2014 (JP) ................................. 2014-202986

(51) Int. Cl.
*G11B 5/39* (2006.01)

(52) U.S. Cl.
CPC ............ *G11B 5/3903* (2013.01); *G11B 5/3932* (2013.01)

(58) Field of Classification Search
CPC .. G11B 5/3903; G11B 5/3906; G11B 5/3912; G11B 5/3932
USPC ............................................ 360/319, 324.12
See application file for complete search history.

(56) References Cited

U.S. PATENT DOCUMENTS

| 8,174,799 B2 | 5/2012 | Hoshiya et al. | |
| 9,053,720 B1* | 6/2015 | Chye | G11B 5/3912 |
| 9,076,468 B1* | 7/2015 | Keener | G11B 5/3932 |
| 2012/0212860 A1* | 8/2012 | Koike | B82Y 10/00 360/294.1 |
| 2012/0225322 A1 | 9/2012 | Han et al. | |
| 2014/0043713 A1 | 2/2014 | Isowaki et al. | |
| 2014/0252517 A1* | 9/2014 | Zhang | G11B 5/3932 257/422 |
| 2014/0252518 A1* | 9/2014 | Zhang | H01L 43/12 257/422 |
| 2014/0293474 A1* | 10/2014 | Yamane | G11B 5/3932 360/75 |
| 2014/0340793 A1* | 11/2014 | Song | G11B 5/3912 360/319 |
| 2015/0098155 A1* | 4/2015 | Lapicki | G01R 33/093 360/319 |
| 2015/0116868 A1* | 4/2015 | Lu | G11B 5/11 360/319 |
| 2015/0170686 A1* | 6/2015 | Singleton | G11B 5/3912 360/319 |
| 2015/0213816 A1* | 7/2015 | Okawa | G11B 5/39 360/319 |
| 2015/0248903 A1* | 9/2015 | Aoyama | G11B 5/3912 360/99.08 |

FOREIGN PATENT DOCUMENTS

| JP | 2004-039869 | 2/2004 |
| JP | 2009-064528 | 3/2009 |
| JP | 2014-038671 | 2/2014 |

* cited by examiner

*Primary Examiner* — Jefferson Evans
(74) *Attorney, Agent, or Firm* — Finnegan, Henderson, Farabow, Garrett & Dunner, L.L.P.

(57) ABSTRACT

A magnetic head of an embodiment has first and second magnetic shields, a stack, a side shield, and an antiferromagnetic layer. The stack has a pin layer, a nonmagnetic layer, and first and second free layers. The second free layer is antiferromagnetically exchange coupled to the first free layer and is exchange coupled to the antiferromagnetic layer. The side shield is exchange coupled to the antiferromagnetic layer.

16 Claims, 15 Drawing Sheets

MAGNETIC HEAD HAVING FIRST MAGNETIC SHIELD, STACK, SIDE SHIELD, ANTIFERROMAGNETIC LAYER, AND SECOND MAGNETIC SHIELD, MAGNETIC HEAD ASSEMBLY, MAGNETIC RECORDING AND REPRODUCING APPARATUS, AND MANUFACTURING METHOD OF MAGNETIC HEAD

This application is based upon and claims the benefit of priority from Japanese Patent Application No. 2014-202986, filed on Oct. 1, 2014; the entire contents of which are incorporated herein by reference.

FIELD

Embodiments described herein relate generally to a magnetoresistive effect element, a magnetic head, a magnetic head assembly, a magnetic recording and reproducing apparatus, and a manufacturing method of the magnetic head.

BACKGROUND

A magnetoresistive effect element is used as a magnetic head (a reproducing element head) for an HDD (Hard Disk Drive) or the like. In order to reduce influence of an external magnetic field, it is common to dispose a magnetoresistive effect element between magnetic shields in the magnetic head of the HDD, and a reproducing resolution is prescribed by an interval between the magnetic shields.

In the HDD, improvement of the reproducing resolution is desired in order for improvement of a reproducing density. However, in a conventional magnetic head, shortening an interval between magnetic shields is difficult due to a structure, so that it has become difficult to improve the recording density.

Thus, in order to heighten a resolution, a magnetic head of a differential output type is suggested. The magnetic head of the differential output type has two free layers which react to a signal magnetic field, and a reproducing resolution is prescribed by a free layer interval. In other words, compared with the conventional magnetic head, heightening of a resolution mainly in a line recording density direction (BPI direction) is more practicable.

However, in the magnetic head of the differential output type, it is not necessarily easy to heighten a resolution in a track width direction (TPI direction).

DETAILED DESCRIPTION

A magnetic head according to an embodiment has a first and a second magnetic shield, a stack, a side shield, and an antiferromagnetic layer. The stack is disposed on the first magnetic shield. The side shield is disposed on the first magnetic shield in a manner to face a side surface of the stack. The antiferromagnetic layer is disposed on the stack and the side shield. The second magnetic shield is disposed on the antiferromagnetic layer.

The stack has a pinned layer, a nonmagnetic layer, a first free layer, and a second free layer. The pinned layer is disposed on the first magnetic shield and its magnetization direction is fixed. The nonmagnetic layer is disposed on the pinned layer. The first free layer is disposed on the nonmagnetic layer, and its magnetization direction changes in correspondence with an external magnetic field. The second free layer is disposed on the first free layer, antiferromagnetically exchange coupled to the first free layer, exchange coupled to the antiferromagnetic layer, and its magnetization direction changes in correspondence with the external magnetic field. The side shield is exchange coupled to the antiferromagnetic layer.

Hereinafter, embodiments will be described in detail with reference to the drawings.

First Embodiment

Figure 1A:
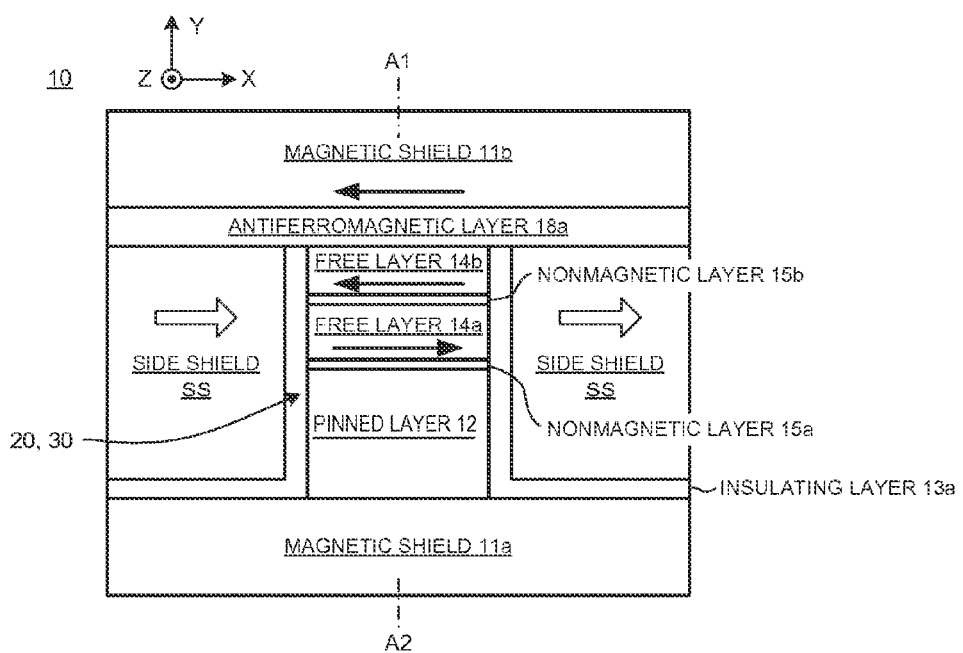
FIG. 1A and FIG. 1B are schematic views showing a magnetic head according to a first embodiment.
Figure 1B:
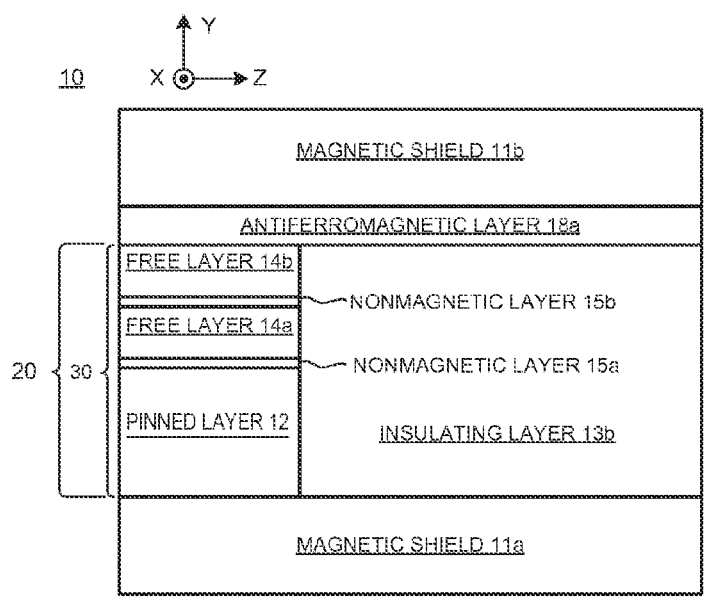

FIG. 1A and FIG. 1B are schematic views showing a magnetic head (a differential output type reproducing element head) 10 according to a first embodiment. FIG. 1A is a plan view of the magnetic head 10. FIG. 1B is a cross-sectional view taken along a line A1-A2 of FIG. 1A and shows the magnetic head 10 in a depth direction of a paper plane of FIG. 1A.

Here, drawings are schematic or conceptual, and a relation between a thickness and a width of each portion, a proportion of sizes among portions, and so on are not necessarily the same as real ones. Further, there is a case where the same portion is shown with different sizes or proportions depending on the drawings.

Note that in the present specification and the drawings hereinafter, the same reference number is given to an element similar to an aforementioned element in connection with the previous drawing and detailed explanation will be omitted accordingly.

The magnetic head 10 is mounted on a magnetic head (a later-described magnetic head 93) of an HDD (a later described magnetic recording and reproducing apparatus 90), for example. The plan view of FIG. 1A is a schematic view, for example, viewed from a direction perpendicular to a medium surface of a magnetic recording medium (a later-described magnetic recording medium 91) mounted on the HDD. The cross-sectional view of FIG. 1B is a schematic view, for example, viewed from a direction parallel to the medium surface of the magnetic recording medium.

As shown in FIG. 1A and FIG. 1B, the magnetic head 10 includes a magnetic shield 11a (a first magnetic shield), a magnetic shield 11b (a second magnetic shield), a pinned layer 12, a nonmagnetic layer 15a (a nonmagnetic layer), a free layer 14a (a first free layer), a nonmagnetic layer 15b (a second magnetic layer), a free layer 14b (a second free layer), an antiferromagnetic layer 18a, a side shield SS, and insulating layers 13a, 13b. An arrow included with each of the magnetic shield 11b, the free layers 14a, 14b, and the side shield SS indicates a direction of magnetization of each element.

Here, when a direction from the magnetic shield 11a toward the magnetic shield 11b is indicated as a Y axis direction, the Y axis direction is a film-forming direction of a film. A direction orthogonal to the Y axis direction, horizontal to film-forming surfaces of the magnetic shields 11a, 11b, and going toward the side shield SS is indicated as an X axis direction. A direction orthogonal to the Y axis direction and orthogonal also to the X axis direction is indicated as a Z axis direction.

Note that the X axis direction and the Y axis direction correspond to a track width direction (TPI direction) and a line recording density direction (BPI direction), respectively.

In the magnetic head 10, the pinned layer 12, the non-magnetic layer 15a, the free layer 14a, the non-magnetic layer 15b, and the free layer 14b are almost the same in sizes in the X axis direction and the Z axis direction (are rectangles of almost the same shape), and constitute a stack 20.

In the present embodiment, the stack 20 is also a magnetoresistive effect element 30. This also applies to stacks 20a, 20b and magnetoresistive effect elements 30a, 30b in second and third embodiments.

The magnetoresistive effect element 30 outputs a signal by a magnetoresistive effect between the free layer 14a and the pinned layer 12. The magnetoresistive effect element 30 is a differential type magnetoresistive effect element outputting a signal which corresponds to a difference in changes of the magnetization directions of the free layers 14a, 14b to a signal magnetic field.

A reproducing resolution of the magnetoresistive effect element 30 is prescribed by an interval between the free layers 14a, 14b. In other words, the magnetoresistive effect element 30 is easier to be made to have a high resolution compared with a magnetoresistive effect element (a later-described magnetoresistive effect element 30x of a first comparative example) which has a single free layer.

The magnetic shields 11a, 11b have a shielding function. As a result that a magnetic permeability of the magnetic shields 11a. 11b is high and that magnetization moves to an external applied magnetic field, a shielding effect is exhibited.

The magnetic shields 11a, 11b have a shielding function to shield an external magnetic field other than a magnetic field (a magnetic field from a magnetic recording medium) from directly under the magnetoresistive effect element 30 (from the Z axis direction). The magnetic shields 11a, 11b particularly shield the external magnetic field applied from Y axis positive direction and negative direction to the magnetoresistive effect element 30 (free layers 14a, 14b).

The magnetic shields 11a, 11b can be constituted with soft magnetic materials. For the magnetic material, there can be used any one of NiFe, CoZrTa, CoZrNb, CoZrNbTa, CoZrTaCr, and CoZrFeCr (hereinafter, referred to as "NiFe and so on"), for example. Multilayer films which each include any one of NiFe and so on may be used for the magnetic shields 11a, 11b.

Note that the magnetic shields 11a, 11b may be of different magnetic materials or may have different stack structures from each other.

Magnetization directions of the magnetic shields 11a, 11b are the X axis direction in a case where an applied magnetic field from the outside does not exist, that is, in an initial state. Antiferromagnetic layers such as of IrMn and PtMn, for example, may exist inside the magnetic shields 11a, 11b. Further, layers of Ru, for example, may be disposed inside the magnetic shields 11a, 11b to make layers of both sides thereof antiferromagnetic coupled.

Thicknesses of the magnetic shields 11a, 11b, that is, thicknesses in the Y axis direction are 500 nm or more, for example, 1000 nm. This is for the purpose of obtaining a good shielding characteristic.

The side shield SS has a shielding function to shield an external magnetic field other than the magnetic field (the magnetic field from the magnetic recording medium) from directly under the magnetoresistive effect element 30 (from the Z axis direction). The side shield SS particularly shields an external magnetic field applied from X axis positive direction and negative direction to the magnetoresistive effect element 30 (the free layers 14a, 14b).

A pair of side shields SS are disposed on both side surfaces in the X axis direction of the stack 20 in a manner to face each other. These side shields SS are disposed to face X axis direction end surfaces of the free layers 14a, 14b. A magnetic field from the side shield SS is applied to the free layers 14a. 14b via the insulating layer 13a.

The side shield SS can be constituted with a soft magnetic material. For the magnetic material, there can be used any one of NiFe and so on, for example, similarly to for the magnetic shields 11a, 11b. A multilayer film which each include any one of NiFe and so on may be used for the side shield SS.

The side shield SS is exchange coupled to the antiferromagnetic layer 18a.

Exchange coupling means that a plurality of magnetic layers (magnetic materials) are magnetically coupled via an interface thereof or an intermediate layer existing therebetween. The former exchange coupling and latter exchange coupling are direct magnetic coupling and indirect magnetic coupling, respectively. Exchange coupling is different from static magnetic field coupling by a leakage magnetic field from an end portion of the magnetic layer.

For the intermediate layer, either a single layer (for example, a non-magnetic layer) or multiple layers (for example, an alternate stack of a non-magnetic layer and a magnetic layer) can be used. In other words, magnetic coupling in which a plurality of magnetic layers are indirectly coupled via a non-magnetic layer disposed therebetween is one kind of exchange coupling. In a case of via the non-magnetic layer, exchange coupling depends on a film thickness of the non-magnetic layer and acts at a time that the non-magnetic layer is as quite thin as 2 nm or less, for example.

It can be conceived that, in exchange coupling, a ferromagnetic coupling bias magnetic field (or an antiferromagnetic coupling bias magnetic field) acts between the magnetic layers. For example, when an applied magnetic bias or the like from the outside does not exist, directions of magnetization between the magnetic layers can be the same direction (ferromagnetic coupling state) or opposite directions (antiferromagnetic coupling state) all together by the above exchange coupling action.

When there is an applied magnetic field bias or the like from the outside, the applied magnetic field bias or the like also acts on magnetization of the inside of the magnetic layer.

In other words, magnetization of the inside of the magnetic layer is oriented in a direction determined by composition of the applied magnetic field bias magnetic field from the outside and a bias magnetic field (a ferromagnetic coupling bias magnetic field component or an antiferromagnetic coupling magnetic field component) by exchange coupling. On this occasion, a direction of the bias magnetic field by exchange coupling and a direction of magnetization between the magnetic layers do not necessary coincide with each other.

In the present embodiment, when simply described as exchange coupling, a case where the direction of magnetization is parallel and a case where the direction of magnetization is antiparallel are included.

In the present embodiment, a magnetization direction in an initial state of the side shield SS, that is, in a case where an applied magnetic field from the outside does not exist, is oriented to the X axis positive direction.

A ferromagnetic layer, a nonmagnetic layer, or a structure made of a stack of a ferromagnetic layer and a nonmagnetic layer may be inserted between the side shield SS and the antiferromagnetic layer 18a. On that occasion, exchange coupling between the side shield SS and the antiferromagnetic layer 18a is maintained through such magnetic layer and/or the nonmagnetic layer.

As a material for the ferromagnetic layer, preferable are NiFe, CoZrTa, CoZrNb, CoZrNbTa, CoZrTaCr, and CoZrFeCr. Other than the above materials, CoFe, Co, Fe and so on can be used, but the former materials (NiFe, CoZrTa, CoZrNb, CoZrNbTa, CoZrTaCr, and CoZrFeCr) are better in side shielding characteristic, and thus are more preferable. A film thickness of the ferromagnetic layer is preferable to be 1 nm or more to 5 nm or less.

As a material for the nonmagnetic layer, a metal material such as Ru, Cu, Pt, Pd, Au, and Ag is preferable, and an alloy material containing any one of the above may also be used. A film thickness of the nonmagnetic layer is preferable to be 0.2 nm or more to 2 nm or less. The ferromagnetic layer and the antiferromagnetic layer 18a are directly exchange coupled, and the ferromagnetic layer and the side shield SS are antiferromagnetically exchange coupled via the nonmagnetic layer. A plurality of sets of the ferromagnetic layers and the nonmagnetic layers may exist.

The side shield SS has a shielding function. A magnetic permeability of the side shield SS is high, and as a result that magnetization moves to the outside applied magnetic field, the shielding function is exhibited. The side shield SS also generates a bias magnetic field to the free layers 14a, 14b.

The insulating layer 13a is disposed between the side shield SS and the magnetic shield 11a, and between the side shield SS and the stack 20. Further, the insulting layer 13b is disposed between the magnetic shields 11a, 11b.

For the insulating layer 13a, there can be used an insulating material (for example, at least any one of a silicon oxide (for example SiO$_2$), a silicon nitride, a silicon oxynitride, an aluminum oxide (for example, Al$_2$O$_3$), an aluminum nitride, and an aluminum oxynitride).

For also the insulating layer 13b, an insulating material similar to that for the insulating layer 13a can be used. However, composing materials of the insulating layers 13a, 13b may be different from each other.

A film thickness of the insulating layer 13a is 1 nm or more to 4 nm or less, for example. By the insulating layer 13a, it becomes possible to flow a current only to the magnetoresistive effect element 30 without flowing a current to the side shield SS, between the magnetic shields 11a, 11b. Thereby, it becomes easy to make the magnetoresistive effect element 30 have high output. Note that the insulating layer 13b also contributes to flowing the current only to the magnetoresistive effect element 30.

Note that a thickness of each portion is measurable by observation of a cross section of each part by a TEM (transmission electron microscope).

A magnetization direction of the pinned layer 12 does not change practically even if an external magnetic field is applied and is in a state of being fixed.

The pinned layer 12 can be constituted with a stacked film made of a base layer, an antiferromagnetic layer (a second antiferromagnetic layer), a plurality of ferromagnetic layers (first and second ferromagnetic layers), and a plurality of nonmagnetic layers (third nonmagnetic layers). However, it is possible that the pinned layer 12 does not have an antiferromagnetic layer. Magnetization directions of the antiferromagnetic layer and the ferromagnetic layer included in the pinned layer 12 are oriented to the Z axis direction.

For the base layer, there can be used Ta, Cr, NiCr, or FeNi, or NiCr on Ta, or the like. A thickness of the base layer is 1 nm or more to 4 nm or less.

Note that the pinned layer 12 may be constituted by patterning a part of the base layer.

For the antiferromagnetic layer, IrMn, PtMn, and so on can be used. A film thickness (a thickness in the Y axis direction) of the antiferromagnetic layer is 5 nm or more to 20 nm or less, for example.

For the ferromagnetic layer, CoFe, NiFe, CoFeB, and so on can be used. A film thickness of the ferromagnetic layer is 1 nm or more to 5 nm or less, for example.

As a material for the nonmagnetic layer, a metal material such as Ru, Cu, Pt, Pd, Au, and Ag is preferable, and an alloy material containing any one of the above may also be used. A thickness of the nonmagnetic layer is 0.3 nm or more to 2 nm or less, for example.

Magnetization of the antiferromagnetic layer and the nonmagnetic layer in the pinned layer 12 is oriented to the Z axis direction. The pinned layer 12 can be constituted by stacking a base layer (Ta (1 nm)), an antiferromagnetic layer (IrMn (8 nm)), a ferromagnetic layer (CoFe (2 nm)), a nonmagnetic layer (Ru (0.4 nm)), and a ferromagnetic layer (CoFe (2.5 nm)) in sequence, for example.

For the nonmagnetic layer 15a, there can be used an insulating material (MgO, AlO (an Al oxide), Tio (a Ti oxide) and so on) or a nonmagnetic metal material (Cu, Ag, and so on). In a case where the nonmagnetic layer 15a is constituted with either the insulating material or the nonmagnetic metal material, a film thickness (a length along the Y axis direction of the nonmagnetic layer 15a) of the nonmagnetic layer 15a is preferable to be 0.5 nm or more to 2 nm or less. When being within a film thickness range above, it is possible to obtain a high magnetoresistive effect characteristic from the magnetoresistive effect element 30.

As a material for the nonmagnetic layer 15b, a metal material such as Ru, Cu, Pt, Pd, Au, and Ag is preferable, and an alloy material containing any one of the above may also be used. A thickness of the nonmagnetic layer 15b is 0.3 nm or more to 2 nm or less. When being within a film thickness range above, it is possible to antiferromagnetically exchange couple the free layers 14a, 14b.

The free layer 14a (the first free layer) is disposed on the nonmagnetic layer 15a and its magnetization direction changes in correspondence with an external magnetic field.

The free layer 14b (the second free layer) is antiferromagnetically exchange coupled to the free layer 14a via the nonmagnetic layer 15b, and a magnetization direction changes in correspondence with an external magnetic field.

For the free layers 14a, 14b, ferromagnetic materials are used. For these materials, there can be used, for example, CoFe, CoFeB, NiFe, CoFeMn, CoFeMnSi, CoFeMnGe, CoFeMnGeSi, and so on. The free layers 14a, 14b are not required to be of the same magnetic material but may be of different magnetic materials. For example, the free layer 14a may be of CoFeB, with the free layer 14b being of CoFe.

Film thicknesses of the free layers 14a, 14b are 2 nm or more to 8 nm or less. The film thicknesses of the free layers 14a, 14b are not required to be the same but may be different from each other.

Figure 27:
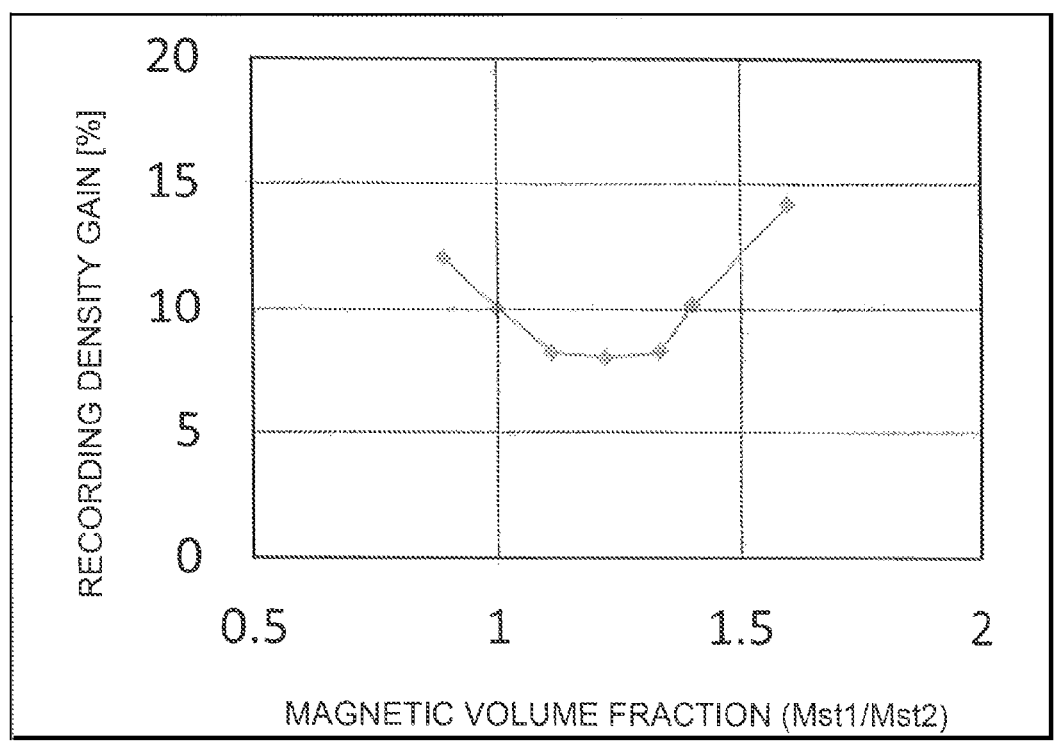

A ratio (magnetic volume Mst1 of free layer 14a/magnetic volume Mst2 of free layer 14b) of magnetic volumes (Mx×V (product of saturation magnetization and volume)) of the free layers 14a, 14b is preferable to be 1.0 or less, or 1.4 or more. As shown in FIG. 27 described later, when this ratio (Mst1/Mst2) is 1.0 or less, or 1.4 or more, it is possible to make a recording density large.

The magnetic volume can be changed by the saturation magnetization Ms of the magnetic materials constituting the free layers 14a, 14b, and can also be changed by volumes V of the free layers 14a, 14b. The volume V can be changed by the film thicknesses of the free layers 14a, 14b, for example.

Directions of magnetization of the free layer 14b and the side shield SS are preferable to be antiparallel directions than parallel directions. Operation becomes more stable in a case where the directions of magnetization are the antiparallel directions.

Figure 26:
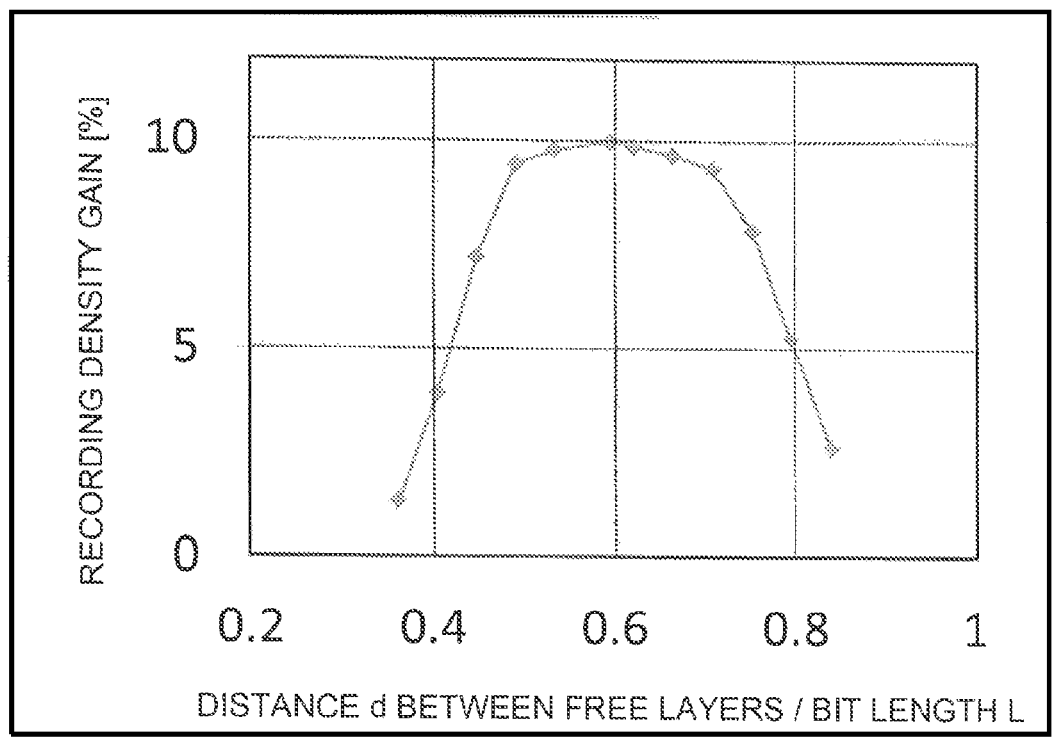
FIG. 26 and FIG. 27 are graphs showing an example of a characteristic of a magnetic head.

A distance d between the free layers 14a, 14b is preferable to be 0.5 or more to 0.7 or less in relation to a bit length L (d/L=0.5 to 0.7) When the distance d is within this range, a BPI gain and a TPI gain are compossible. If this distance is smaller than 0.5, the TPI gain increases but the BPI gain decreases, and a recording density gain (BPI gain×TPI gain) as a whole is hard to be obtained. If this distance is larger than 0.7, both BPI gain and TPI gain decrease, so that the recording density gain as a whole also decreases. FIG. 26 described later also shows that improvement of the recording density can be contrived by a ratio (d/L) of the distance d to the bit length L being 0.5 or more to 0.7 or less.

The distance d between the free layers 14a 14b is a distance from a Y axis direction center of the free layer 14a to a Y axis direction center of the free layer 14b.

The bit length L is a bit length in the line recording density direction (BPI direction) and its value changes depending on largeness of a line recording density being a target. For example, when the line recording density being the target is 2600 kfci, the bit length is 9.77 [nm]. The bit length corresponding to the line recording density is calculated by "2.54 [cm]/line recording density target [kFCI]".

A distance between the free layers 14a, 14b can be adjusted by changing the film thickness(es) of one or both of the free layers 14a, 14, for example.

It is possible to insert a ferromagnetic layer, a nonmagnetic layer, or a stack structure (a structure made of a stack of a ferromagnetic layer and a nonmagnetic layer) between the free layers 14b, 14a. On that occasion, exchange coupling between the free layer 14b and the antiferromagnetic layer 18a is maintained through the magnetic layer and/or nonmagnetic layer.

As a material for the ferromagnetic layer, CoFe, CoFeB, Co, and Fe are preferable. Other than the above materials, there can be used NiFe, CoZrTa, CoZrNb, CoZrNbTa, CoZrTaCr, CoZrFeCr, and so on. However, the former materials (CoFe, CoFeB, Co, and Fe) can be exchange coupled to the antiferromagnetic layer 18a and the free layer 14b more fastly.

A film thickness of the ferromagnetic layer is preferable to be 1 nm or more to 5 nm or less.

As a material for the nonmagnetic layer, preferable is a metal material such as Ru, Cu, Pt, Pd, Au, or Ag, and an alloy material containing any one of the above can also be used. A film thickness of the nonmagnetic layer is preferable to be 0.2 nm or more to 2 nm or less.

The ferromagnetic layer and the antiferromagnetic layer 18a are directly exchange coupled to each other and the ferromagnetic layer and the free layer 14 are antiferromagnetically exchange coupled via the nonmagnetic layer. A plurality of sets of the ferromagnetic layers and the nonmagnetic layers may exist.

The antiferromagnetic layer 18a extends to above the side shield SS. As a material for the antiferromagnetic layer 18a, IrMn, PtMn, and so on are preferable. A film thickness of the antiferromagnetic layer 18a is preferable to be 3 nm or more to 15 nm or less. A magnetization direction of the antiferromagnetic layer 18a is the X axis direction. The antiferromagnetic layer 18a is exchange coupled to the free layer 14b.

Figure 1C:
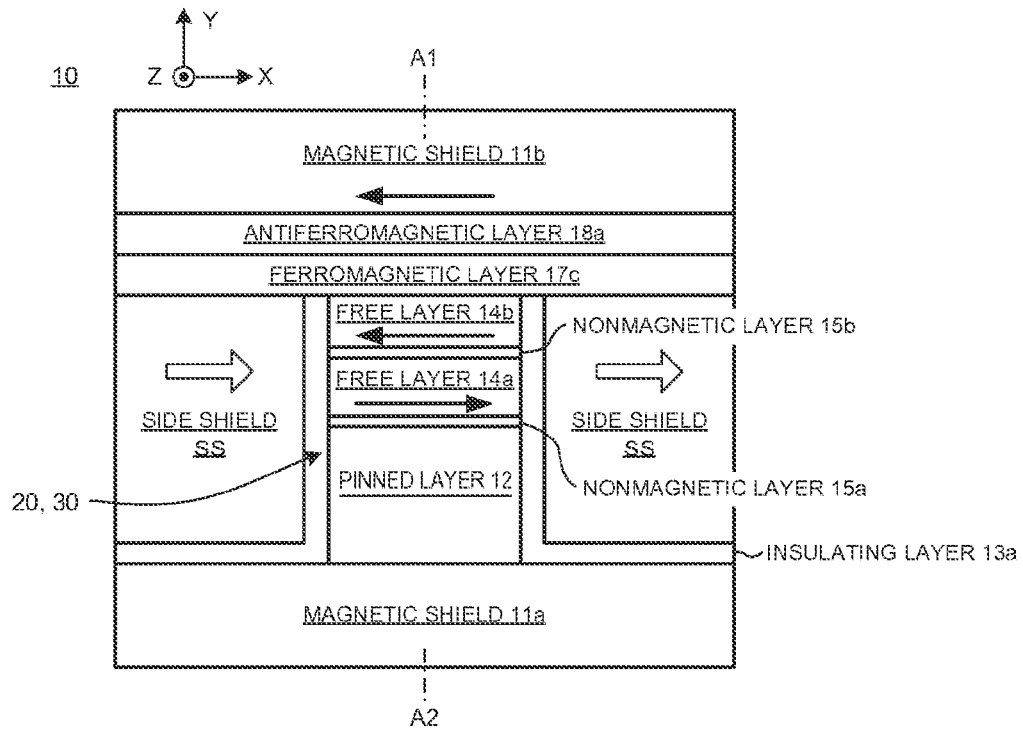
FIG. 1C and FIG. 1D are schematic views showing a magnetic head according to a modification of the first embodiment.
Figure 1D:
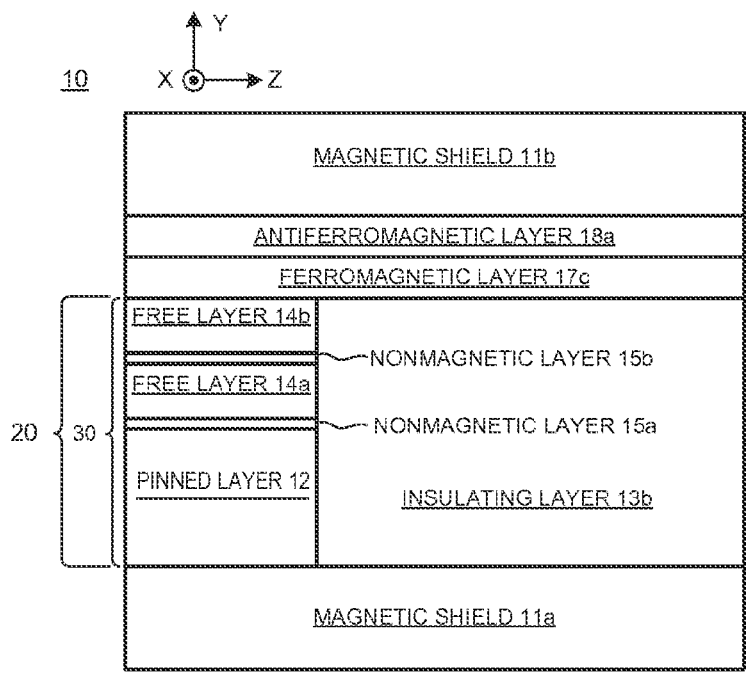

As shown in FIGS. 1C and 1D, a ferromagnetic layer 17c (a third ferromagnetic layer) extending to above the side shield SS may be inserted between the antiferromagnetic layer 18a and the free layer 14b. On this occasion, the antiferromagnetic layer 18a and the ferromagnetic layer 17c are exchange coupled. Further, the side shield SS is exchange coupled to the ferromagnetic layer 17c.

Further, it is possible to insert a nonmagnetic layer with a thickness of 0.2 nm or more to 2 nm or less which is made of a metal material such as Ru, Cu, Pt, Pd, Au, and Ag, between the free layer 14b and the ferromagnetic layer 17c. The nonmagnetic layer may be of an alloy material containing any one of the above metal elements. In this case, the ferromagnetic layer 17c and the free layer 14b are antiferromagnetically exchange coupled via the nonmagnetic layer. Further, the ferromagnetic layer 17c and the side shield SS are exchange coupled via the nonmagnetic layer.

A difference in kind of material, magnetic volume, or the like can be judged by combining shape observation by cross-section TEM, composition analysis by cross-section TEM and EDX, and so on.

By the above structure, heightening of resolutions both in the BPI direction and the TPI direction becomes possible.

First Comparative Example

Figure 2A:
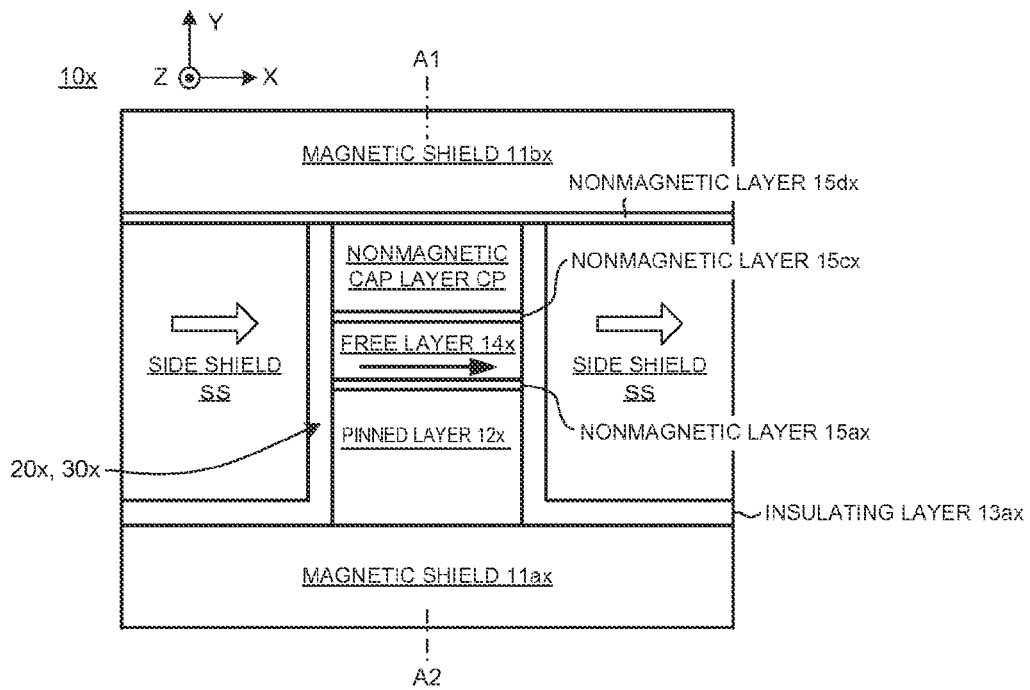
FIG. 2A, FIG. 2B are schematic views showing a magnetic head according to a first comparative example.
Figure 2B:
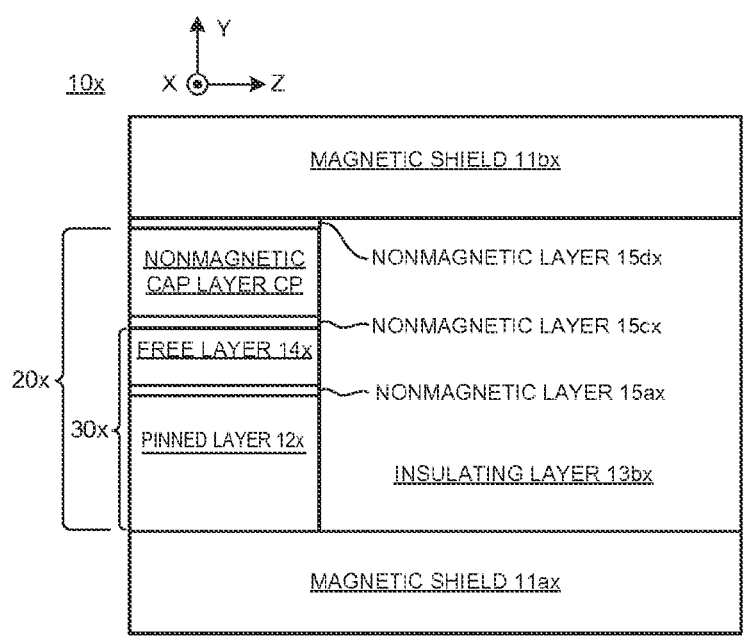

FIG. 2A and FIG. 2B are schematic views showing a magnetic head 10x according to a first comparative example. As shown in FIG. 2A and FIG. 2B, the magnetic head 10x includes magnetic shields 11ax, 11bx, a pin-pinned layer 12x, a nonmagnetic layer 15ax, a free layer 14x, a nonmagnetic layer 15cx, a nonmagnetic cap layer CP, a nonmagnetic layer 15dx, a side shield SS, and insulating layers 13ax, 13bx.

In the magnetic head 10x, the pinned layer 12x, the nonmagnetic layer 15ax, the free layer 14x, the nonmagnetic layer 15cx, and the nonmagnetic cap layer CP are almost the same in sizes in an X axis direction and a Z axis direction (are rectangles of almost the same shape), and constitute a stack 20x.

In the stack 20x, the pinned layer 12x, the nonmagnetic layer 15ax, and the free layer 14x constitute a magnetoresistive effect element 30x.

Since the free layer 14x is single, the magnetic head 10x is a magnetic head of the magnetoresistive effect element 30 of a non-differential type (TMR (Tunnel Magneto-Resistance Effect) Type), and is easy to receive influence of an external noise. Therefore, in order to make the magnetic head 10x have a high resolution in a BPI direction, it is necessary to narrow an interval between the magnetic shields 11ax, 11bx. However, since the magnetoresistive effect element 30x, the nonmagnetic cap layer CP, and so on exist between the magnetic shields 11ax and 11bx, there is a limit in reduction (narrowing the gap) of the interval between the magnetic shields 11ax, 11bx.

In contrast, in the first embodiment, since the resolution in the BPI direction of the magnetic head 10 (the magnetoresistive effect element 30) is prescribed by the distance between the free layers 14a, 14b, heightening of the resolution is easy. The interval between the free layers 14a, 14b is sufficiently narrow compared with the interval between the magnetic shields 11ax, 11bx in the magnetic head 10x of the first comparative example. For example, the interval between the free layers 14a, 14b of the magnetic head 10 is 7.2 nm. In contrast, the interval between the magnetic shields 11ax, 11bx of the magnetic head 10x is about 25 nm, for example.

Further, in the first embodiment, by optimization of the distance d between the free layers 14a, 14b, heightening of the resolutions both in the BPI direction and the TPI direction becomes possible. As a result, heightening of the recording density becomes easy.

Second Comparative Example

Figure 3A:
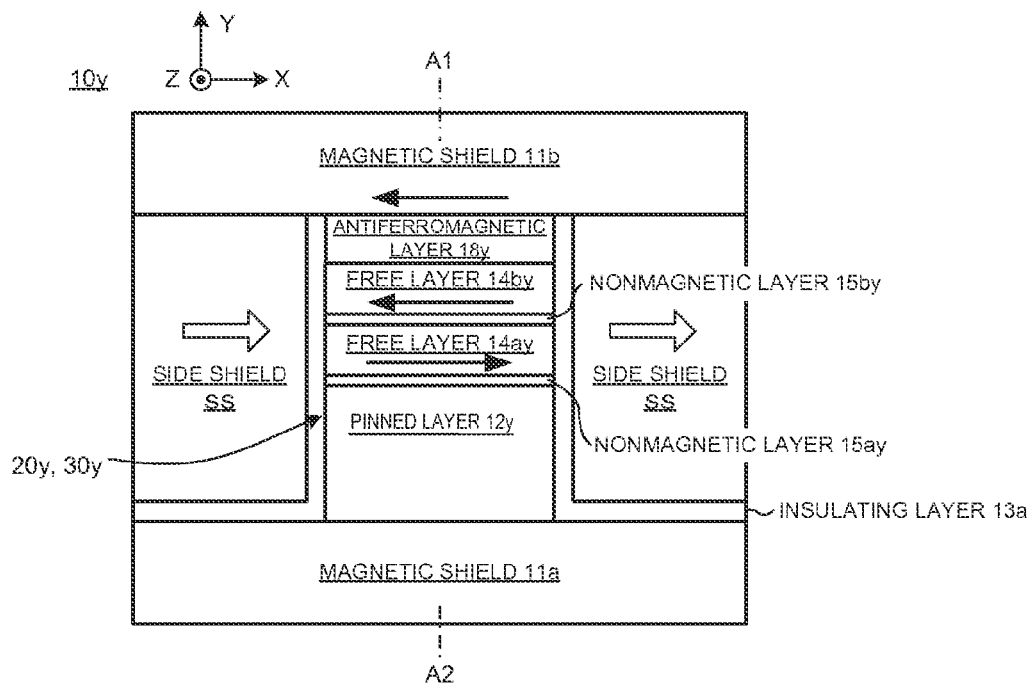
FIG. 3A and FIG. 3B are schematic views showing a magnetic head according to a second comparative example.
Figure 3B:
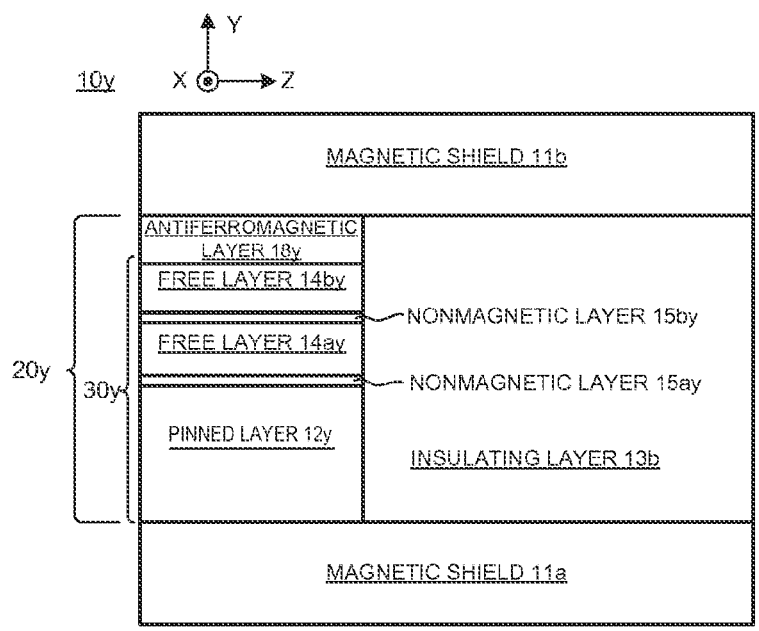

FIG. 3A and FIG. 3B are schematic views showing a magnetic head 10y according to a second comparative example. As shown in FIG. 3A and FIG. 3B, an antiferromagnetic layer 18y does not extend to above a side shield SS, in contrast to the first embodiment.

Figure 12:
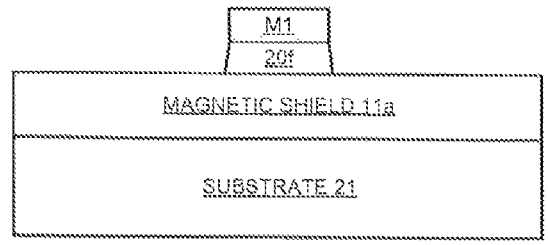

When the magnetoresistive effect element 30y in a track width direction is etched, addition of the antiferromagnetic layer 18y as a film thickness to be etched makes an entire etching film thickness large. As shown in FIG. 12 described later, it is common that a film (a stacked film 20f) after etching has a taper shape which is broadened toward the end. Therefore, widths in the track width direction of free layers 14ay, 14by prescribing a resolution become large, resulting in reduction in resolution in the track width direction (the TPI direction).

In contrast, in the first embodiment, when the magnetoresistive effect element 30 in the track width direction is etched, the antiferromagnetic layer 18a is not added as a film thickness to be etched. Therefore, narrowing the widths in the track width direction of the free layers 14a, 14b becomes easy, and TPI can be heightened. Further, by optimization of the distance d between the free layers 14a, 14b, heightening of TPI and heightening of BPI are also composible, and as a result, the recording density can be heightened.

Second Embodiment

Figure 4A:
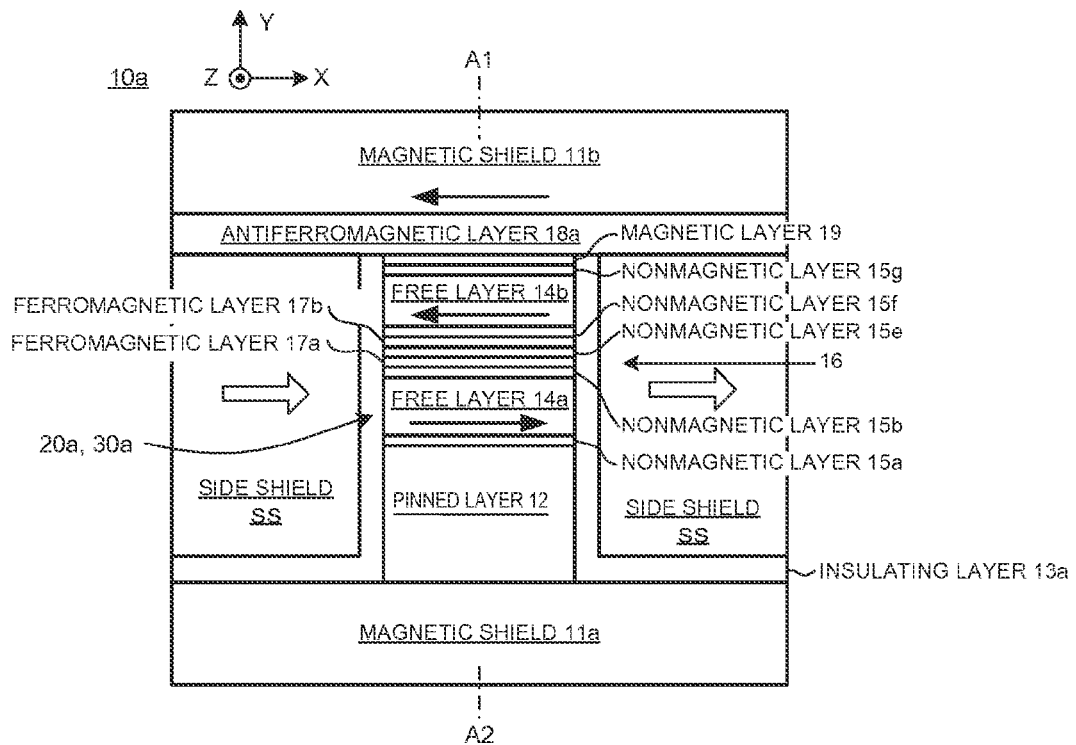
FIG. 4A and FIG. 4B are schematic views showing a magnetic head according to a second embodiment.
Figure 4B:
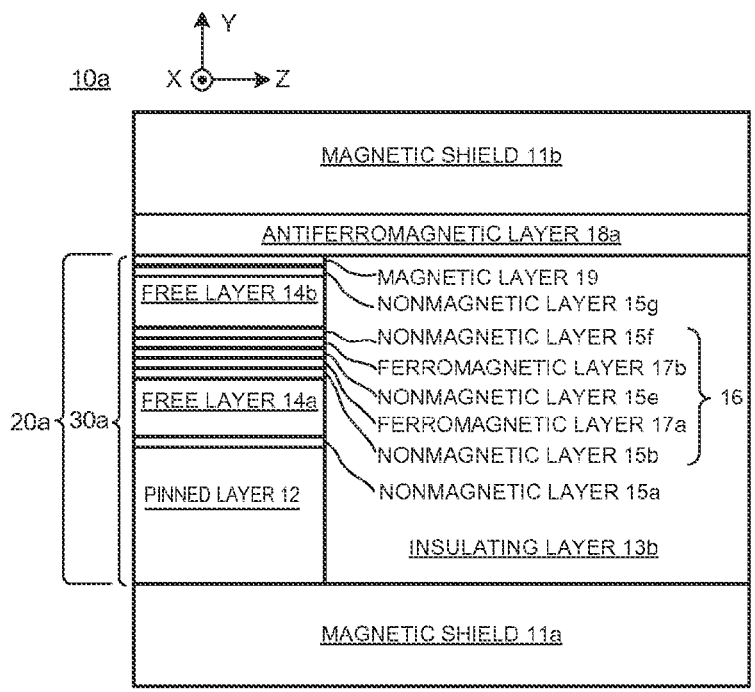

FIG. 4A and FIG. 4B are schematic views showing a magnetic head 10a according to a second embodiment. FIG. 4A is a plan view of the magnetic head 10a. FIG. 4B is a cross-sectional view taken along a line A1-A2 of FIG. 4A and shows the magnetic head 10a in a depth direction of a paper plane of FIG. 4A.

As shown in FIG. 4A and FIG. 4B, the magnetic head 10a includes a magnetic shield 11a (a first magnetic shield), a magnetic shield 11b (a second magnetic shield), a pinned layer 12, a nonmagnetic layer 15a, a free layer 14a (a first free layer), a gap adjusting layer 16, a free layer 14b (a second free layer), a nonmagnetic layer 15g (a fourth nonmagnetic layer), a magnetic layer 19 (a second magnetic layer), an antiferromagnetic layer 18a, a side shield SS, and insulating layers 13a, 13b.

In the magnetic head 10a, compared with the magnetic head 10, the gap adjusting layer 16 is disposed instead of the nonmagnetic layer 15b. Further, the nonmagnetic layer 15g and the magnetic layer 19 are added. The same applies to a stack 20a, a magnetoresistive effect element 30a of the magnetic head 10a.

The gap adjusting layer 16 is inserted between the free layers 14a, 14b, and is constituted by a plurality of nonmagnetic layers 15 and a plurality of ferromagnetic layers 17 (nonmagnetic layers 15(n) and ferromagnetic layers 17 (n−1), n: number of stacks) being stacked alternately. In FIG. 4A and FIG. 4B, the number of stacks n is 3, the nonmagnetic layers 15(1), 15(3), 15(5) are indicated as nonmagnetic layers 15b, 15e, 15f and the ferromagnetic layers 17(2), 17(4) are indicated as ferromagnetic layers 17a, 17b.

In the present embodiment, a distance between the free layers 14a, 14b is adjusted by the gap adjusting layer 16, so that an optimum distance enabling both heightening of TPI and heightening of BPI can be obtained.

The ferromagnetic layers 17 of the gap adjusting layer 16 are antiferromagnetically exchange coupled via the nonmagnetic layer 15. The free layers 14a, 14b are also antiferromagnetically exchange coupled via the gap adjusting layer 16. In other words, the ferromagnetic layers 17 of the gap adjusting layer 16 are stacked even number times, while the nonmagnetic layers 15 are stacked odd number times.

As materials for the nonmagnetic layers 15 (in FIG. 4A and FIG. 4B, the nonmagnetic layers 15e, 15f (here, the nonmagnetic layer 15b is excluded)) of the gap adjusting layer 16, metal materials such as Ru, Cu, Pt, Pd, Au, and Ag are preferable, and an alloy material containing any one of the above may also be used. Film thicknesses of the nonmagnetic layers 15e, 15f (here, the nonmagnetic layer 15b is excluded) of the gap adjusting layer 16 are 0.2 nm or more to 2 nm or less, for example.

For the ferromagnetic layers 17 of the gap adjusting layer 16, for example, CoFe, CoFeB, NiFe, and so on can be used. Film thicknesses of the ferromagnetic layer 17 are 0.5 nm or more to 2 nm or less, for example.

When the materials and the film thicknesses of the nonmagnetic layer 15 and the ferromagnetic layer 17 of the gap adjusting layer 16 are within the above-described range, it is possible to strongly antiferromagnetically exchange couple magnetization between the ferromagnetic layers 17 of the gap adjusting layer 16 and between the free layers 14a, 14b.

The gap adjusting layer 16 is made by stacking Ru (0.4 nm), CoFe (1 nm), Ru (0.4 nm), CoFe (1 nm), and Ru (0.4 nm), for example, in sequence.

When the materials and the film thicknesses of the nonmagnetic layer 15 and the ferromagnetic layer 17 of the gap adjusting layer 16 are within the above-described range, it is possible to strongly antiferromagnetically exchange couple magnetization between the ferromagnetic layers 17 of the gap adjusting layer 16 and between the free layers 14a, 14b. Thereby, adjustment of the distance between the free layers 14a, 14b becomes possible without reducing output of the magnetoresistive effect element 30a.

As described above, the distance between the free layers 14a, 14b is preferable to be 0.5 or more to 0.7 or less in relation to a bit length. The distance between the free layers 14a, 14b can be adjusted to be within the above range by the gap adjusting layer 16.

As a material for the nonmagnetic layer 15g, a metal material such as Ru, Cu, Pt, Pd, Au, and Ag is preferable, and an alloy material containing any one of the above may also be used. A film thickness of the nonmagnetic layer 15g is 0.2 nm or more to 2 nm or less.

As a material for the magnetic layer 19, CoFe, CoFeB, NiFe, and so on can be used. A film thickness of the magnetic layer 19 is 0.5 nm or more to 2 nm or less.

The magnetic layer 19 and the antiferromagnetic layer 18a are exchange coupled. Further, the magnetic layer 19 and the free layer 14b are also exchange coupled via the nonmagnetic layer 15g.

By adjusting the film thickness of the nonmagnetic layer 15g, it is possible to flexibly adjust a relation between a direction of magnetization of the side shield SS and a direction of magnetization of the free layer 14b to be of parallel direction or of antiparallel direction. The relation between the direction of magnetization of the side shield SS and the direction of magnetization of the free layer 14b is more preferable to be of antiparallel direction. Operation of the magnetoresistive effect element 30a becomes more stable.

The kind of the material to be used, the film thickness, or the like can be judged by combining shape observation by cross-section TEM, composition analysis by cross-section TEM and EDX, and so on, for example.

Figure 4C:
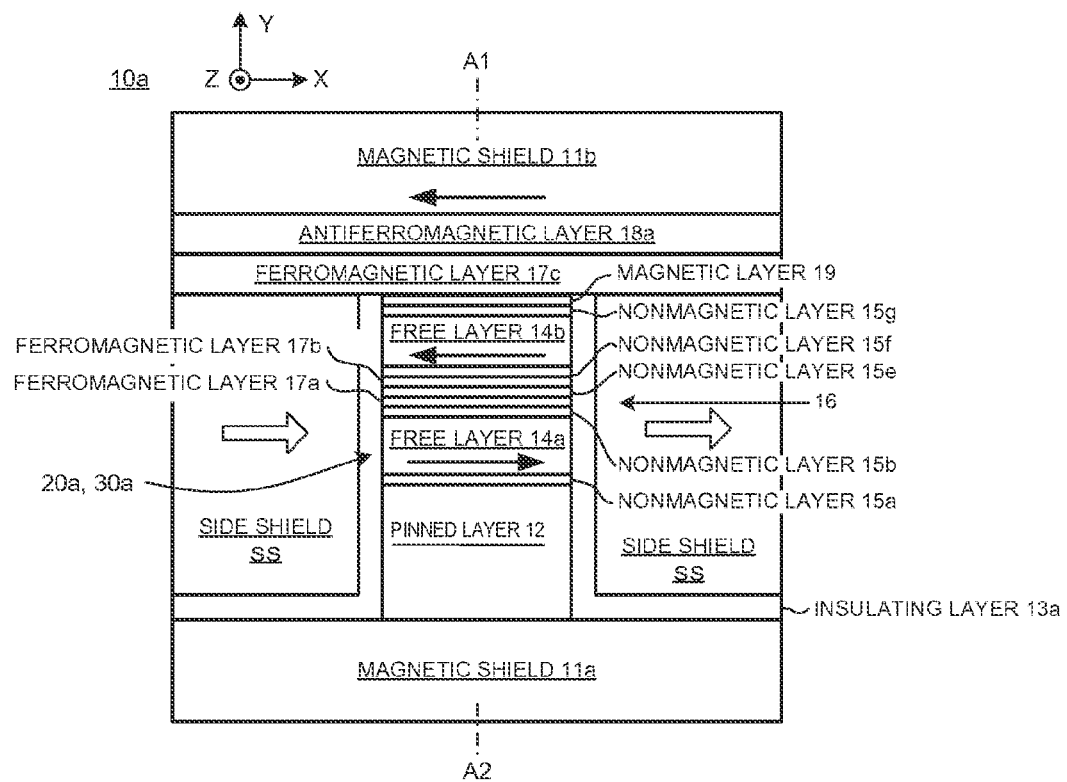
FIG. 4C and FIG. 4D are schematic views showing a magnetic head according to a modification of the second embodiment.
Figure 4D:
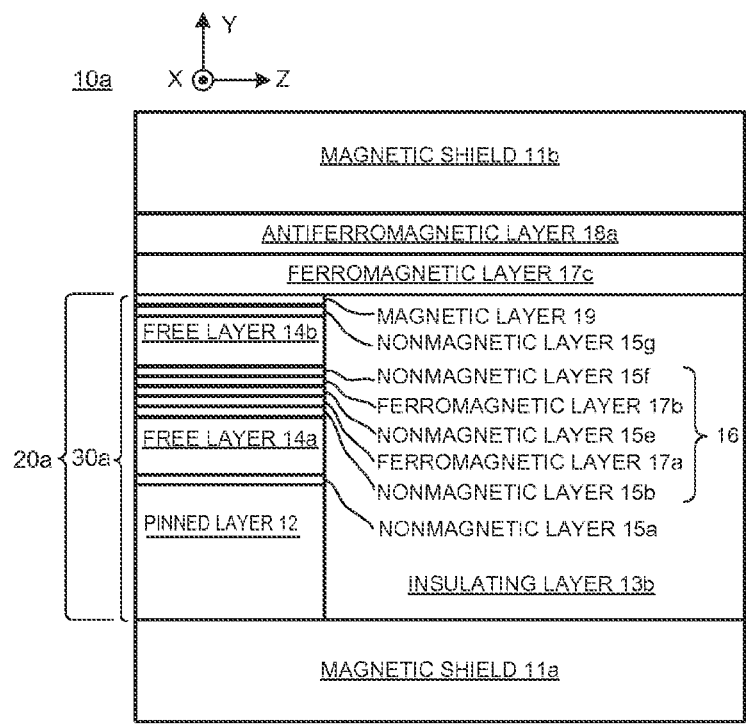

As shown in FIGS. 4C and 4D, a ferromagnetic layer 17c (a third ferromagnetic layer) extending to above the side shield SS may be inserted between the antiferromagnetic layer 18a and the magnetic layer 19. On this occasion, the antiferromagnetic layer 18a and the ferromagnetic layer 17c are exchange coupled. Further, the side shield SS is exchange coupled to the ferromagnetic layer 17c.

Further, it is possible to insert a nonmagnetic layer with a thickness of 0.2 nm or more to 2 nm or less which is made of a metal material such as Ru, Cu, Pt, Pd, Au, and Ag, between the magnetic layer 19 and the ferromagnetic layer 17c. The nonmagnetic layer may be of an alloy material containing any one of the above metal elements. In this case, the ferromagnetic layer 17c and the magnetic layer 19 are antiferromagnetically exchange coupled via the nonmagnetic layer. Further, the ferromagnetic layer 17c and the side shield SS are exchange coupled via the nonmagnetic layer.

Note that since composing materials and film thicknesses of the magnetic shields 11a, 11b, the pinned layer 12, the nonmagnetic layer 15a, the free layer 14a, the nonmagnetic layer 15b, the free layer 14b, the antiferromagnetic layer 18a, and the side shield SS are the same as those of the first embodiment, description thereof will be omitted.

As described above, in the second embodiment, when the magnetoresistive effect element 30a in a track width direction is etched, the antiferromagnetic layer 18a is not added as a film thickness to be etched, and thus, compared with the second comparative example, narrowing the width in the track width direction of the free layers 14a, 14b becomes possible, and heightening of TPI becomes possible.

Further, by the nonmagnetic layer 15g and the magnetic layer 19, the relation between the direction of the magnetization of the side shields SS and the direction of magnetization of the free layer 14b can be adjusted flexibly.

Further, by the gap adjusting layer 16, it is possible to adjust the distance between the frees layers 14a, 14b to be an optimum distance enabling both heightening of TIP and heightening of PBI without reducing output of the magnetoresistive effect element 30a. As a result, heightening of TPI and heightening of BPI become compossible similarly to in the first embodiment, and a recording density can be heightened.

Third Embodiment

Figure 5A:
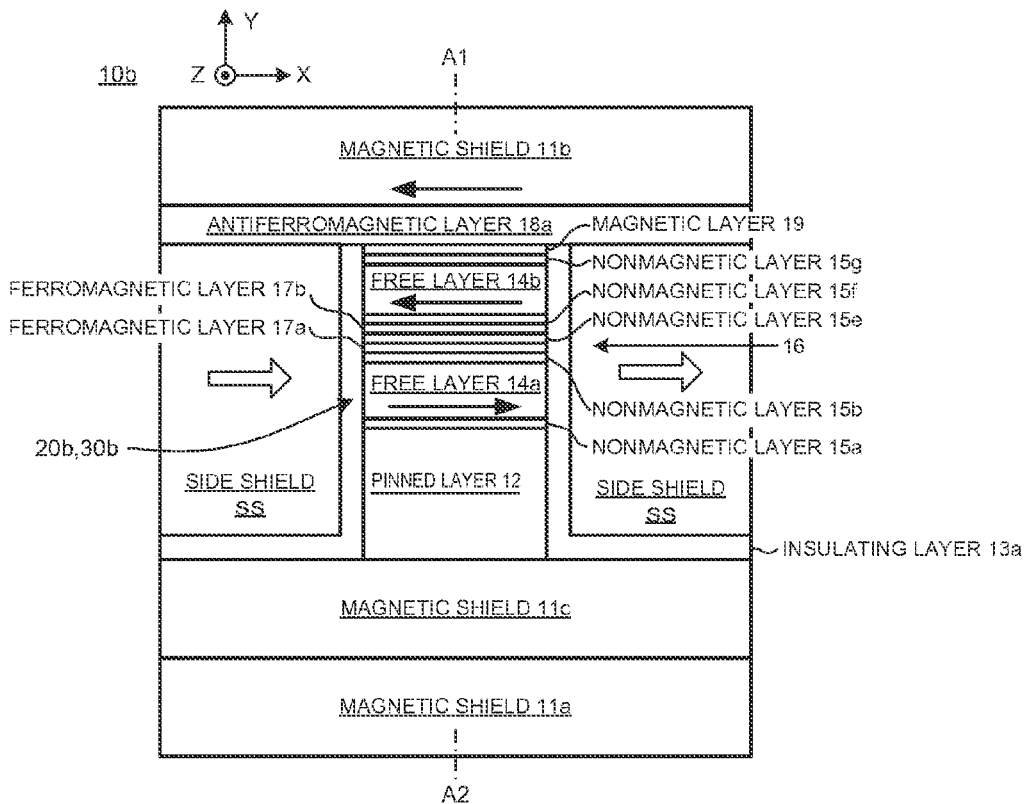
FIG. 5A and FIG. 5B are schematic views showing a magnetic head according to a third embodiment.
Figure 5B:
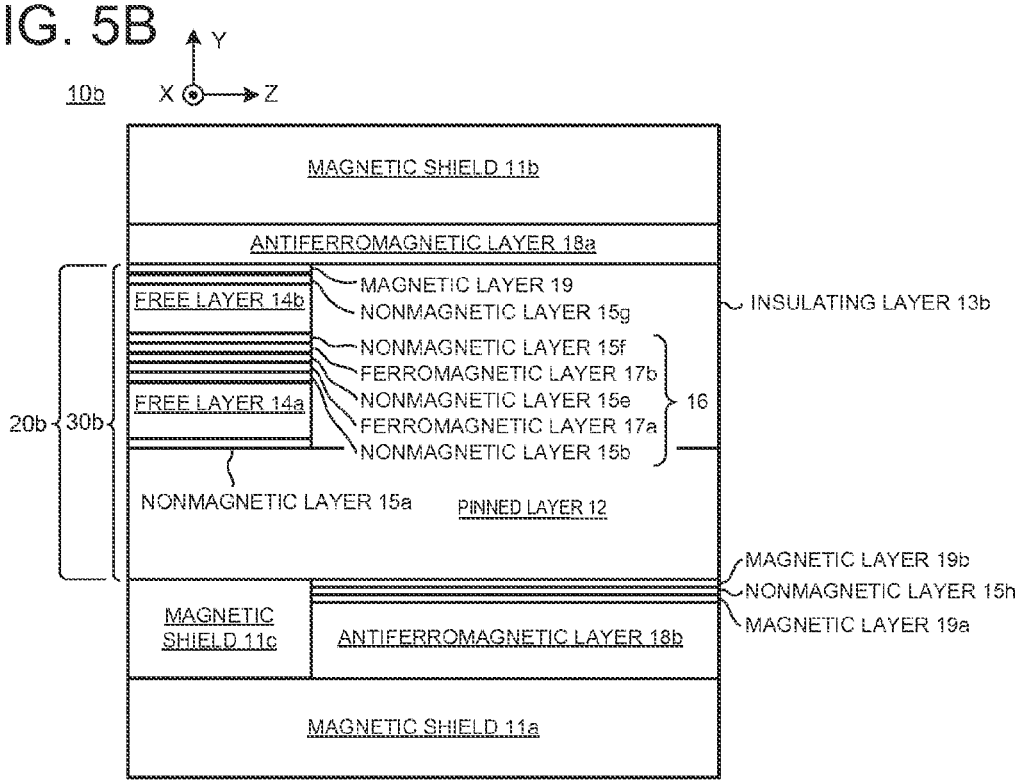

FIG. 5A and FIG. 5B are schematic views showing a magnetic head 10b according to a third embodiment. FIG. 5A is a plan view of the magnetic head 10b. FIG. 5B is a cross-sectional view taken along a line A1-A2 of FIG. 5A and shows the magnetic head 10b in a depth direction of a paper plane of FIG. 5A.

As shown in FIG. 5A and FIG. 5B, the magnetic head 10b includes a magnetic shield 11a (a first magnetic shield), a magnetic shield 11b (a second magnetic shield), a magnetic shield 11c (a third magnetic shield), a pinned layer 12, a nonmagnetic layer 15a, a free layer 14a (a first free layer), a gap adjusting layer 16, a free layer 14b (a second free layer), a nonmagnetic layer 15g (a fourth nonmagnetic layer), a magnetic layer 19 (a second magnetic layer), antiferromagnetic layers 18a, 18b, a side shield SS, and insulating layers 13a, 13b.

To the magnetic head 10b, compared with the magnetic head 10a, the magnetic shield 11c, the antiferromagnetic layer 18b, a magnetic layer 19a, a nonmagnetic layer 15h, and a magnetic layer 19b are added. A stack 20b and a magnetoresistive effect element 30b of the magnetic head 10b have similar configurations as those of the stack 20a and the magnetoresistive effect element 30a of the magnetic head 10a, respectively.

The pinned layer 12 can be constituted with a stacked film made of a base layer, a plurality of ferromagnetic layers, and a plurality of nonmagnetic layers.

A part of the base layer is subjected to etching. For the base layer, there can be used Ta, NiCr, Fe, or Ni, or NiCr on Ta, or the like. A thickness of the base layer is 1 nm or more to 4 nm or less.

For the ferromagnetic layer, CoFe, NiFe, CoFeB and so on can be used. A film thickness of the ferromagnetic layer is 1 nm or more to 5 nm or less, for example.

As a material for the nonmagnetic layer, a metal material such as Ru, Cu, Pt, Pd, Au, and Ad is preferable, and an alloy material containing any one of the above may also be used. A thickness of the nonmagnetic layer is 0.3 nm or more to 2 nm or less, for example.

A magnetization direction of the ferromagnetic layer included in the pinned layer 12 is a Z axis direction. The pinned layer 12 is constituted by stacking Ta (1 nm), CoFe (2 nm), Ru (0.4 nm), and CoFe (2.5 nm) in sequence, for example.

The antiferromagnetic layer 18b (a third antiferromagnetic layer) is disposed alongside the magnetic shield 11c in the Z axis direction. As a material for the antiferromagnetic layer 18b, IrMn, PtMn, and so on can be used. A film thickness of the antiferromagnetic layer 18b is 5 nm or more to 15 nm or less. A magnetization direction of the antiferromagnetic layer 18b is the Z axis direction.

The antiferromagnetic layer 18b is exchange coupled to the pinned layer 12.

Here, a stack structure of the magnetic layer 19a, the nonmagnetic layer 15h, and the magnetic layer 19b is inserted between the antiferromagnetic layer 18b and the pinned layer 12. However, this stack structure may be omitted.

As materials for the magnetic layers 19a and 19b, CoFe, NiFe, CoFeB, and so on can be used. Film thicknesses of the magnetic layers 19a and 19b are 1 nm or more to 3 nm or less.

As a material for the nonmagnetic layer 15h, a metal material such as Ru, Cu, Pt, Pd, Au, and Ag is preferable, and an alloy material containing any one of the above may also be used. A film thickness of the nonmagnetic layer 15h is 0.3 nm or more to 2 nm or less.

The magnetic layers 19a, 19b are antiferromagnetically exchange coupled. The antiferromagnetic layer 18b and the magnetic layer 19a are exchange coupled. The pin-pinned layer 12 and the magnetic layer 19b are exchange coupled.

The magnetic shield 11c is constituted with a soft magnetic material. For the magnetic material, similarly to the magnetic shields 11a, 11b, any one of NiFe and so on can be used, for example, and a multilayer film which each includes any one of NiFe and so on may also be used.

Note that the magnetic shield 11c may be of a different magnetic material or may have a different stack structure from that of the magnetic shields 11a, 11b.

The magnetic shield 11c has a shielding function. A magnetic permeability of the magnetic shield 11c is high, and as a result that magnetization moves to an outside applied magnetic field, the shielding function is exhibited. A thickness of the magnetic shield 11c, that is, a thickness in a Y axis direction is 3 nm or more to 20 nm or less. A length in an X axis direction of the magnetic shield 11c may be smaller than or the same as a length in the X axis direction of the magnetic shield 11a. In FIG. 5A, the X axis length of the magnetic shield 11c is the same as the X axis length of the magnetic shield 11a.

Note that instead of the nonmagnetic layer 15g and the magnetic layer 19, as in a later-described fourth embodiment, a nonmagnetic layer 15i and a magnetic layer 19c may be disposed between the side shield SS and the antiferromagnetic layer 18a. By adjusting a film thickness of the nonmagnetic layer 15i, it becomes possible to flexibly adjust a relation between a direction of magnetization of the side shield SS and a direction of magnetization of the free layer 14b to be of parallel direction or of antiparallel direction.

The kind of the material to be used, the film thickness, or the like can be judged by combining shape observation by cross-section TEM, composition analysis by cross-section TEM and EDX, and so on, for example.

Note that since composing materials and film thicknesses of the magnetic shields 11a, 11b, the nonmagnetic layers 15a, 15g, the antiferromagnetic layer 18a, the magnetic layer 19, the free layers 14a, 14b, the gap adjusting layer 16, and the side shield SS are similar to those of the first and second embodiments, description thereof will be omitted.

As described above, in the third embodiment, when the element in the track width direction is etched, the antiferromagnetic layer 18a is not added as a film thickness to be etched, and thus, compared with the second comparative example, further narrowing the widths in the track width direction of the free layers 14a, 14b becomes possible, and heightening of TPI can be realized.

Further, by the nonmagnetic layer 15g and the magnetic layer 19, the relation between the direction of the magnetization of the side shields SS and the direction of magnetization of the free layer 14b can be adjusted flexibly.

Further, by optimization of a distance between the free layers 14a, 14b by the gap adjusting layer 16, heightening of TPI and heightening of BPI are also composible, and as a result, a recording density can be further heightened.

In the third embodiment also, similarly to in the first and second embodiments, heightening of TPI and heightening of BIP are composible, and a recording density can be heightened.

Fourth Embodiment

Figure 6A:
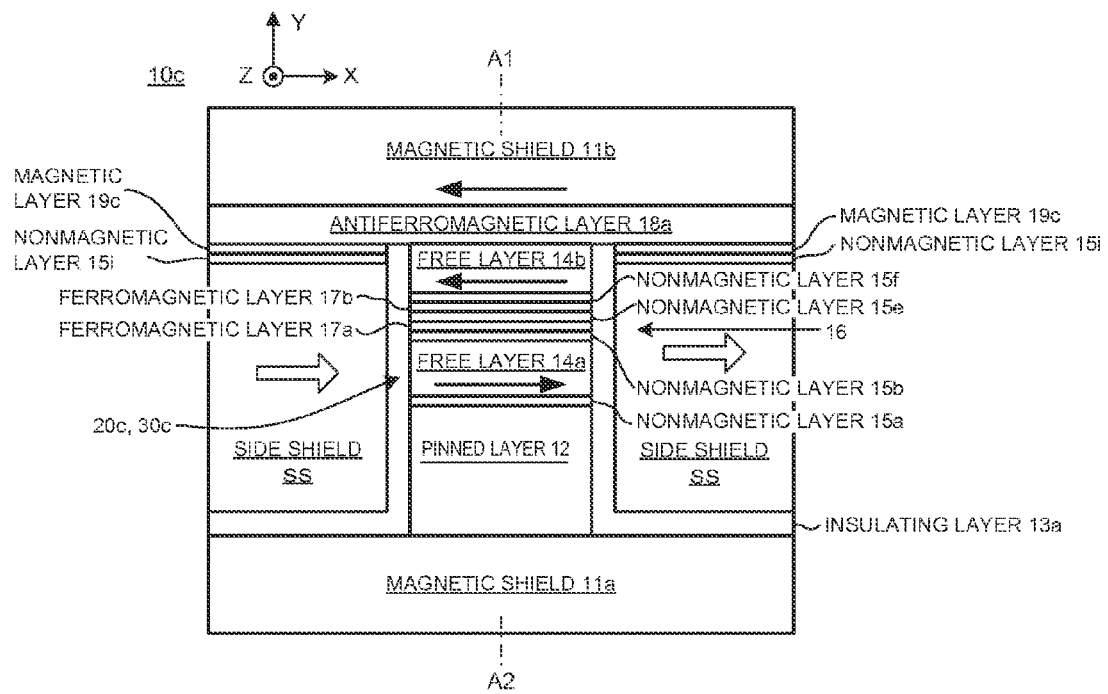
FIG. 6A to FIG. 6B are schematic views showing a magnetic head according to a fourth embodiment.
Figure 6B:
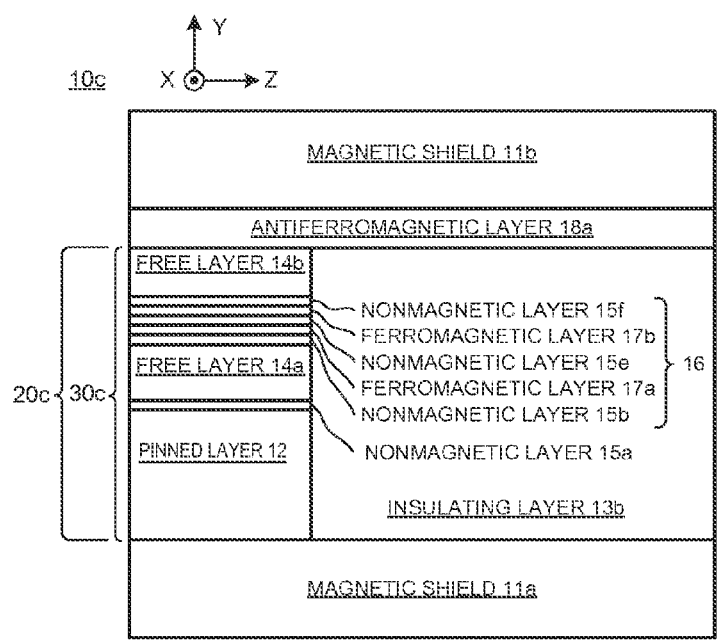

FIG. 6A and FIG. 6B are schematic views showing a magnetic head 10c according to a fourth embodiment. FIG. 6A is a plan view of the magnetic head 10c. FIG. 6B is a cross-sectional view taken along a line A1-A2 of FIG. 6A and shows the magnetic head 10c in a depth direction of a paper plane of FIG. 6A.

As shown in FIG. 6A and FIG. 6B, the magnetic head 10c includes a magnetic shield 11a (a first magnetic shield), a magnetic shield 11b (a second magnetic shield), a pinned layer 12, a nonmagnetic layer 15a, a free layer 14a (a first free layer), a gap adjusting layer 16, a free layer 14b (a second free layer), an antiferromagnetic layer 18a, a side shield SS, a nonmagnetic layer 15i (a fifth nonmagnetic layer), a magnetic layer 19c (a third magnetic layer), and insulating layers 13a, 13b.

The magnetic head 10c is different from the magnetic head 10a in that the magnetic head 10c has the nonmagnetic layer 15i and the magnetic layer 19c instead of the nonmagnetic layer 15g and the magnetic layer 19. A stack 20c, a magnetoresistive effect element 30c of the magnetic head 10c is each different from the stack 20a, the magnetoresistive effect element 30a of the magnetic head 10a in that the stack 20c, the magnetoresistive effect element 30a has neither the nonmagnetic layer 15g nor the magnetic layer 19.

As a material for the nonmagnetic layer 15i, a metal material such as Ru, Cu, Pt, Pd, Au, and Ag is preferable, and an alloy material containing any one of the above may also be used. A film thickness of the nonmagnetic layer 15i is 0.3 nm or more to 2 nm or less.

As a material for the magnetic layer 19c, there can be used NiFe, CoZrTa, CoZrNb, CoZrNbTa, CoZrTaCr, and CoZrFeCr. A film thickness of the magnetic layer 19c is 1 nm or more to 5 nm or less.

The magnetic layer 19c and the antiferromagnetic layer 18a are exchange coupled. Further, the magnetic layer 19c and the side shield SS are also exchange coupled via the nonmagnetic layer 15i.

By adjusting the film thickness of the nonmagnetic layer 15i, it is possible to flexibly adjust a relation between a direction of magnetization of the side shields SS and a direction of magnetization of the free layer 14b to be of parallel direction or of antiparallel direction. The relation between the direction of magnetization of the side shields SS and the direction of magnetization of the free layer 14b is more preferable to be of antiparallel direction. Operation of the magnetoresistive effect element 30c becomes more stable.

The kind of the material to be used, the film thickness, or the like can be judged by combining shape observation by cross-section TEM, composition analysis by cross-section TEM and EDX, and so on, for example.

Note that since composing materials and film thicknesses of the magnetic shields 11a, 11b, the nonmagnetic layer 15a, the antiferromagnetic layer 18a, the free layers 14a, 14b, the gap adjusting layer 16, and the side shield SS are similar to those of the first to third embodiments, description thereof will be omitted As described above, in the fourth embodiment, when the element in a track width direction is etched, the antiferromagnetic layer 18a is not added as a film thickness to be etched, and thus, compared with the second comparative example, further narrowing the widths in the track width direction of the free layers 14a, 14b becomes possible, and heightening of TPI can be realized.

Further, by the nonmagnetic layer 15i and the magnetic layer 19c, the relation between the direction of magnetization of the side shield SS and the direction of magnetization of the free layer 14b can be adjusted flexibly.

Further, by optimization of a distance between the free layers 14a, 14b by the gap adjusting layer 16, heightening of TPI and heightening of BPI are also composible, and as a result, a recording density can be further heightened.

Fifth Embodiment

Figure 7:
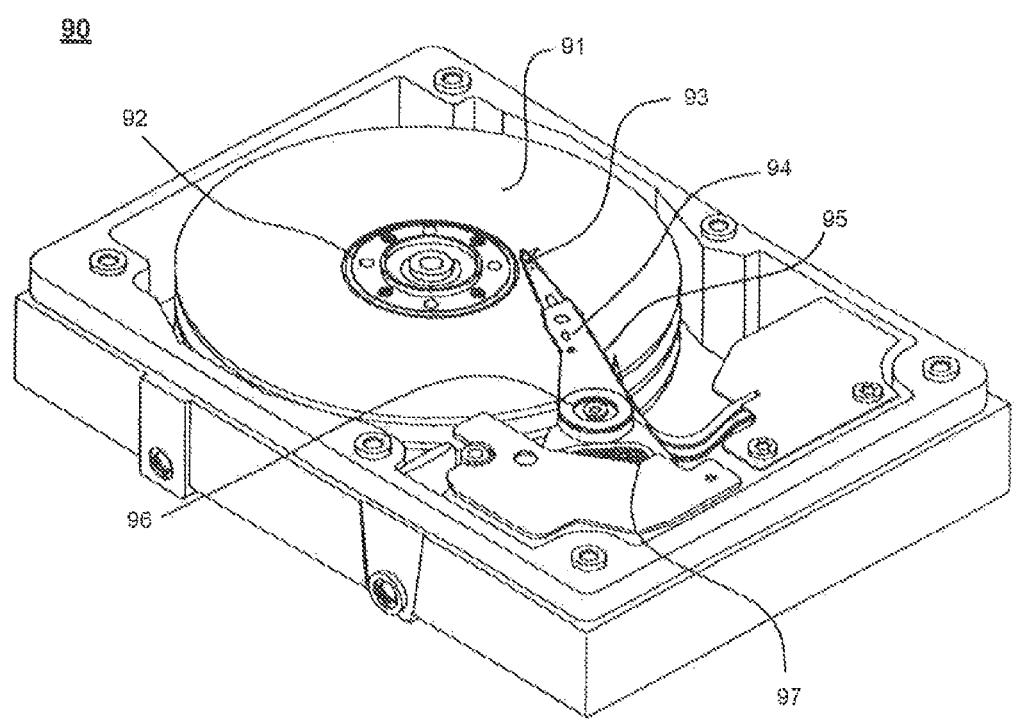
FIG. 7 is a view showing a magnetic recording and reproducing apparatus according to a fifth embodiment.

FIG. 7 is a view showing a magnetic recording and reproducing apparatus (an HDD (Hard Disk Drive) apparatus) 90 according to a fifth embodiment. The magnetic recording and reproducing apparatus 90 has a magnetic recording medium 91, a spindle motor 92, and a magnetic head 93. Information is magnetically written in and read out of the magnetic recording medium 91. Any one of the magnetic heads 10 to 10c is used for the magnetic head 93, and magnetically reads out information from the magnetic recording medium 91.

The magnetic recording and reproducing apparatus 90 is an apparatus of a type to use a rotary actuator. The magnetic recording medium 91 is mounted on the spindle motor 92 and rotated by a motor (not shown) which responds to a control signal from a drive control unit (not shown).

When the magnetic recording medium 91 rotates, a pressing pressure by a suspension 94 balances with a pressure generated by a surface to face the medium (also referred to as ABS) of a head slider. Consequently, the surface to face the medium (magnetic head 93) of the head slider is held with a predetermined floating amount from a surface of the magnetic recording medium 91.

The suspension 94 is connected to one end of an actuator arm 95 having a bobbin part or the like which holds a drive coil (not shown). A voice coil motor 97 being one kind of a linear motor is provided in the other end of the actuator arm 95. The voice coil motor 97 can be constituted with a drive coil (not shown) wound up by the bobbin part of the actuator arm 95 and a magnetic circuit made of a permanent magnet and a counter yoke which are disposed to face each other in a manner to sandwich the coil.

The actuator arm 95 is held by ball bearings (not shown) provided in upper and lower two places of a shaft receiving part 96 and is capable of rotation sliding freely by the voice coil motor 97. Consequently, it is possible to move the magnetic recording head to an arbitrary position of the magnetic recording medium 91.

A magnetic head assembly is constituted with the magnetic head 93, the suspension 94, and the actuator arm 95.

(Manufacturing Method)

A. Manufacture of Magnetic Heads 10, 10a of First and Second Embodiments

Figure 8:
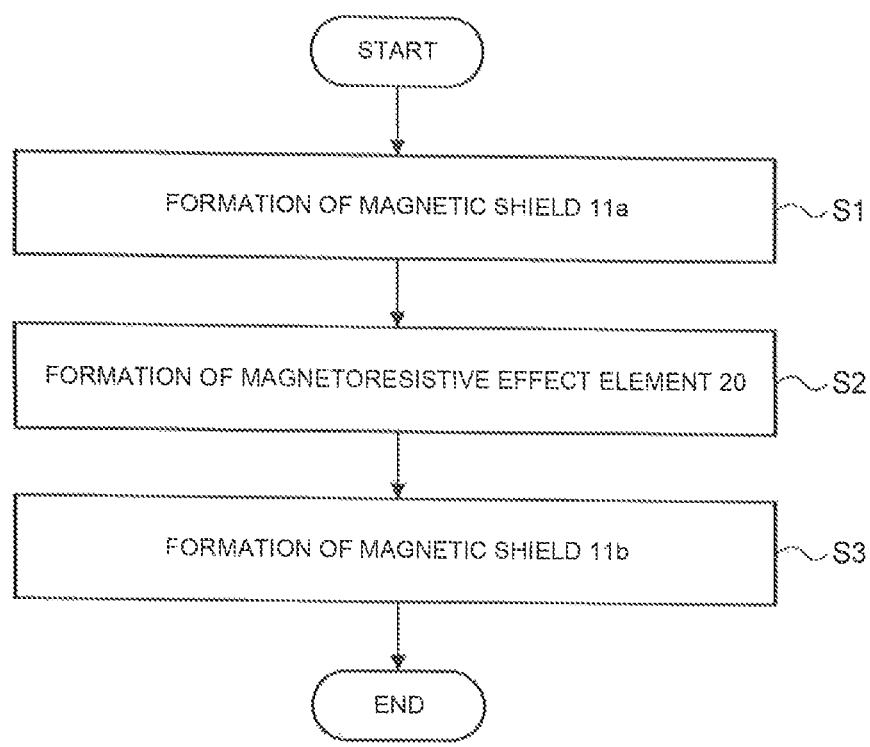
FIG. 8 is a flowchart showing an example of a manufacturing method of a magnetic head.

FIG. 8 is a flowchart showing an example of a manufacturing method of the magnetic heads 10, 10a of the first and second embodiments.

FIG. 9 to FIG. 19 are schematic cross-sectional views of an example of a magnetic head during manufacture. FIG. 9 to FIG. 14, and FIG. 19 correspond to FIG. 1A, while FIG. 15 to FIG. 18 correspond to FIG. 1B.

Figure 9:
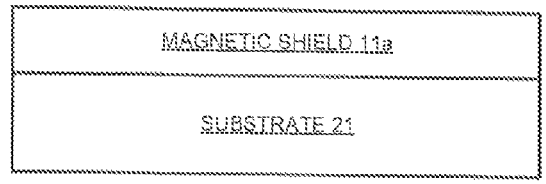
FIG. 9 to FIG. 25 are schematic cross-sectional views of an example of a magnetic head during manufacture.

(1) Formation of Magnetic Shield 11a (Step S1, See FIG. 9)

As shown in FIG. 9, a magnetic shield 11a is formed on a substrate 21. Details of these procedures are as follows, for example.

a) A deposit (a magnetic shield film, for example, a metal layer) of a material to be the magnetic shield 11a is formed on the substrate 21 by electroplating. A composing material of the magnetic shield film is NiFe, for example. A thickness in a Y axis direction of the magnetic shield film is 1 μm, for example.

b) A surface of the magnetic shield film is polished. For example, irregularities of the surface of the magnetic shield film are planarized by a chemical mechanical polishing (CMP) method.

c) Thereafter, an upper surface of the magnetic shield is etched and an oxidation layer and a contaminated layer are removed. The oxidation layer is attached to the magnetic shield film during a manufacturing process, for example. For example, the substrate 21 is carried to a chamber (not shown), the inside of the chamber is depressurized (for example, vacuumized), and the upper surface of the magnetic shield film is etched by an ion beam.

(2) Formation of Stack 20 (Magnetoresistive Effect Element 30) (Step S2, See FIG. 10 to FIG. 18)

Figure 10:
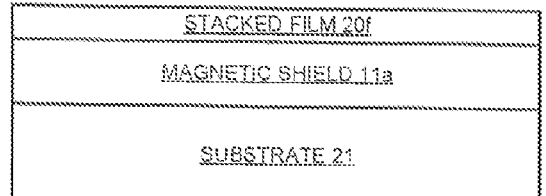

A stack 20 (magnetoresistive effect element 30) is formed on the magnetic shield 11a. Details of these procedures are as described in procedures of the following a) to i).

a) While the inside of the chamber is kept to be depressurized, a stacked film 20f to be the stack 20 (the magnetoresistive effect element 30) is formed on the magnetic shield 11a by sputtering, for example (see FIG. 10).

Figure 11:
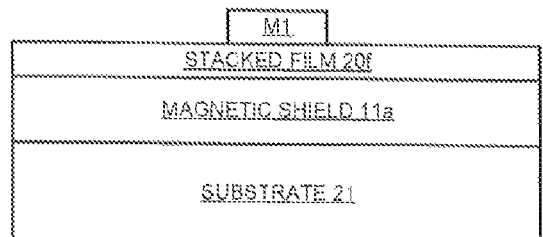

The stacked film 20f includes, as shown in FIG. 1A and FIG. 1B, for example, a pinned layer 12, a nonmagnetic layer 15a, a free layer 14a, a nonmagnetic layer 15b, and a free layer 14b. An entire thickness in a Y axis direction of the stacked film 20f is 28 nm, for example.

b) A mask pattern M1 is formed on the stacked film 20f (see FIG. 11).

As the mask pattern M1, for example, a resist mask or a metal mask containing Ta is used. The mask pattern M1 is formed by using an optical lithography technique, for example. A shape of an upper surface of the mask pattern M1 prescribes a width in an X axis direction of the stacked film 20f. This width is 36 nm, for example.

c) By using the mask pattern M1 as a mask, the stacked film 20f is etched by ion beam etching, for example (see FIG. 12). Consequently, a pattern of a part of the stacked film 20f is formed.

On this occasion, as shown in FIG. 12, the stacked film 20f is etched to have a tapered shape broadening toward a Y axis negative direction. Consequently, in proportion as a film thickness of the stacked film 20f to be etched is small, it is possible to form a smaller width (a track width (a width in a TPI direction (the X axis direction)) shape. In the present embodiment, since an antiferromagnetic layer 18a is not included in a film thickness to be etched, a narrow track width can be formed, so that TPI can be heightened.

In contrast, in a structure of the second comparative example, since etching including the antiferromagnetic layer 18y is necessary, a film thickness to be etched is large, so that narrowing of the track width and furthermore heightening of TPI become difficult. In other words, in a case of the structure of the second comparative example, there is a tendency that a resolution in a BPI direction is improved but a resolution in a TPI direction is reduced.

Figure 13:
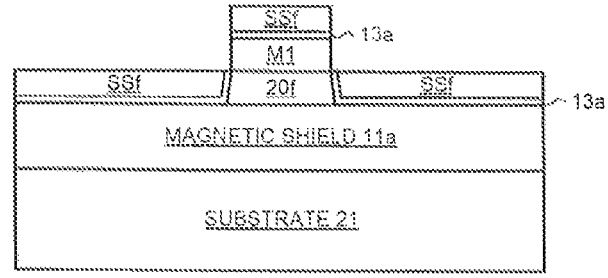

In the present embodiment, while heightening of a resolution (heightening of BPI) in a line recording density direction is maintained, affinity to a mass production process of the magnetoresistive element of a differential output type is further improved. Thus, in addition to heightening of the resolution (heightening of BPI) in the line recording density direction, heightening of a resolution (heightening of TPI) in a track width direction also becomes possible. Consequently, a recording density can be improved.

d) An insulating layer 13a and a side shield film SSf are stacked in sequence on the mask pattern M1 and the magnetic shield 11a (see FIG. 13). The side shield film SSf becomes a side shield SS (see FIG. 14)

Figure 14:
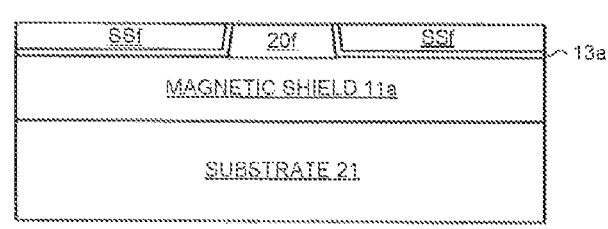

The insulating layer 13a prevents electric conduction to the side shield SS and can be constituted with $Al_2O_3$, for example. A thickness in the Y axis direction of the insulating layer 13a is 3 nm, for example. A material for the side shield film SSf is NiFe, for example. A thickness in the Y axis direction of the side shield film SSf is a thickness to fill an etched region, for example.

e) The mask pattern M1, the insulating layer 13a and the side shield film SSf on the mask pattern M1 are removed by a lift-off method, for example (see FIG. 14). Thereafter, planarization is carried out by CMP (Chemical Mechanical Polishing) or the like so that upper surfaces of the side shield film SSf and the stack film 20f become even. Consequently, the side shield SS is formed from the side shield film SSf.

Figure 15:
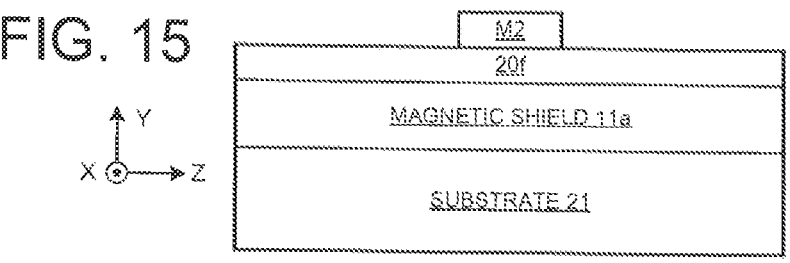
Figure 16:
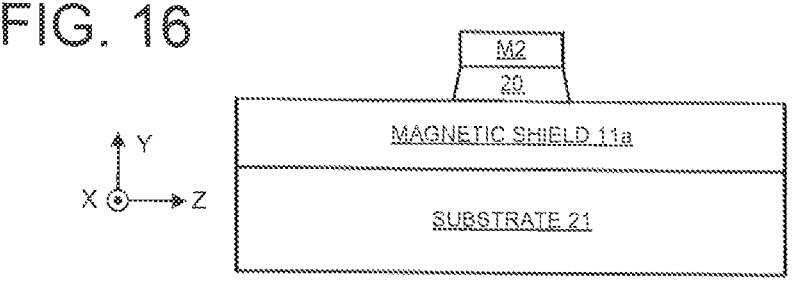

Next, a shape viewed from FIG. 1B is fabricated.

f) On the stacked film 20f to be the magnetoresistive effect element 30, the stacked film 20f in the X axis direction being patterned, a mask pattern M2 is stacked similarly to in FIG. 11 (see FIG. 15). A difference from FIG. 11 resides in that an upper surface shape of the mask pattern M2 prescribes a width in a Z axis direction.

g) By using the mask pattern M2 as a mask, the stacked film 20f is etched by an ion beam or the like, so that a stack 20 is formed (see FIG. 16).

Figure 17:
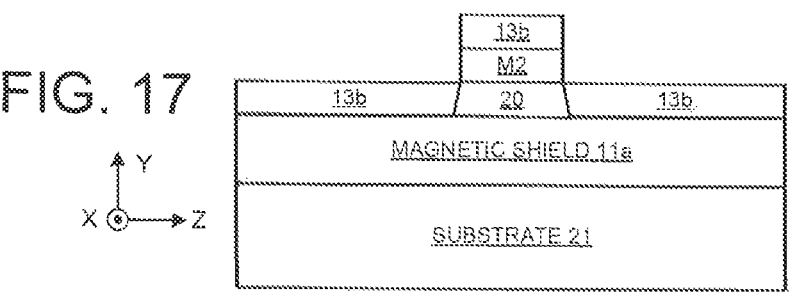
Figure 18:
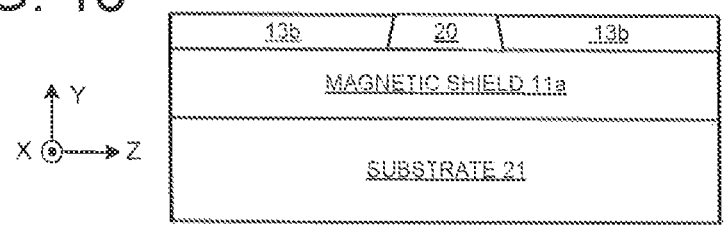

An insulating layer 13b constituted with $Al_2O_3$, for example, is stacked on the mask pattern M2 and the magnetic shield 11a film (see FIG. 17). With regard to a thickness in the Y axis direction of the insulating layer 13b, the insulating layer 13b is stacked to fill an etched region. FIG. 17 shows a case where the insulating layer 13b is stacked to fill the etched region.

i) The insulating layer 13b on the mask pattern M2 is removed by lift-off (see FIG. 18). Thereafter, planarization is carried out by CMP or the like so that upper surfaces of the insulating layer 13b and the stack 20 become even.

Figure 19:
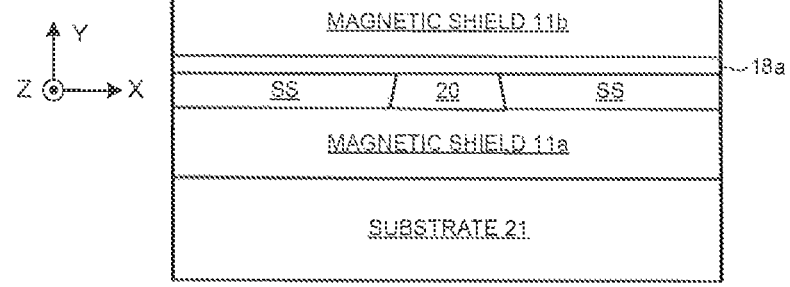

(3) Formation of Magnetic Shield 11b (Step S3, See FIG. 19)

An antiferromagnetic layer 18a and a magnetic shield 11b are stacked in sequence on the stack 20 and the side shield SS by sputtering, for example (see FIG. 19). FIG. 19 shows a shape when viewed from FIG. 1A.

A composing material of the magnetic field 11b is NiFe, for example. A thickness in the Y axis direction of the magnetic shield 11b is 1 μm, for example.

A composing material of the antiferromagnetic layer 18a is IrMn, for example. A thickness in the Y axis direction of the antiferromagnetic layer 18a is 8 nm, for example.

The manufacturing method of the magnetic head hereinabove according to the embodiment is an example, and only the point is described. In practice, thereafter, there are included processes such as a formation process of a writing head, a cutting processing of a wafer, and formation of a magnetic recording medium facing surface by polishing. Further, an annealing process in a magnetic field such as an antiferromagnetic layer is included. Conventional manufacturing methods are applicable to the above processes. Such conventional manufacturing methods will not be described.

B. Manufacture of Magnetic Head 10b of Third Embodiment

A manufacturing method of a magnetic head 10b of a third embodiment will be described.

FIG. 20 to FIG. 24 show schematic cross-sectional views of an example of a magnetic head during manufacture. FIG. 20 to FIG. 24 correspond to FIG. 5B, while FIG. 25 corresponds to FIG. 5A.

Note that a flowchart of this manufacturing method will be omitted since the flowchart is practically the same except that magnetic shields 11a, 11c are formed in a step S1 of FIG. 8.

(1) Formation of Magnetic Shield 11a, 11c (See FIG. 20 to FIG. 24)

Figure 20:
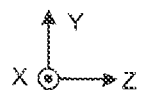
Figure 20:
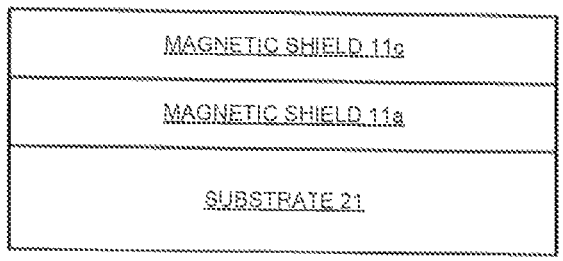

Magnetic shields 11a. 11c are formed on a substrate 21 (see FIG. 20). Details of these procedures are as follows, for example.

a) Deposits (first and third magnetic shield films, for example metal layers) of materials to be the magnetic shields 11a, 11c are formed on the substrate 21 by electroplating. Composing materials for the first and third magnetic shield films are NiFe, for example. A thickness in a Y axis direction of the first magnetic shield film is 1 μm, for example. A thickness in the Y axis direction of the third magnetic shield film is 12 nm, for example.

b) Thereafter, an upper surface of the third magnetic shield is etched and an oxidation layer and a contaminated layer are removed. The oxidation layer is attached to the magnetic shield film during a manufacturing process, for example. For example, the substrate 21 is carried to a chamber (not shown), the inside of the chamber is depressurized (for example, vacuumized), and the upper surface of the third magnetic shield film is etched by an ion beam.

Figure 21:
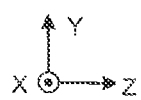
Figure 21:
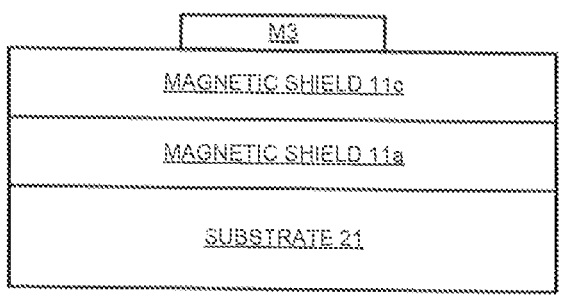

A base layer may be formed on the third magnetic shield film. As the base layer, Ta may be used, for example. A thickness in the Y axis direction of the base layer is 2 nm, for example. The base layer is formed as a part of a pinned layer 12.

c) A mask pattern M3 is formed on the third magnetic shield film (magnetic shield 11c) (see FIG. 21).

As the mask pattern M3, for example, a resist mask or a metal mask containing Ta is used. The mask pattern M3 is formed by using an optical lithography technique, for example.

The mask pattern M3, as for its shape, is a mask of a line shape which prescribes a width in a Z axis direction, for example. Thereby, the third magnetic shield film in the Z axis direction is etched. The width in the Z axis direction is 500 nm, for example.

Figure 22:
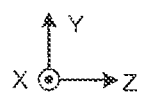
Figure 22:
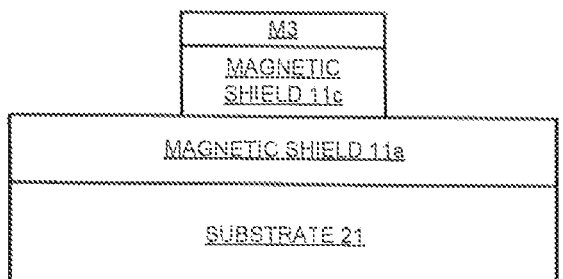

It is possible to prescribe also a length in an X axis direction by changing the shape of the mask pattern M3. The length in the X axis direction on that occasion can be made to be 100 nm or less, for example. For example, the length is 40 nm.

d) By using the mask pattern M3 as a mask, the third magnetic shield film is etched by ion beam etching, for example (see FIG. 22).

Figure 23:
Figure 23:
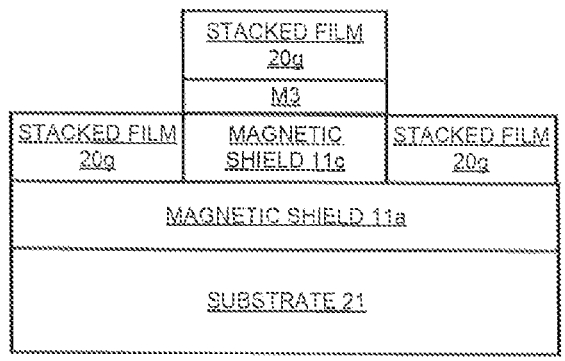

As a result of etching, the magnetic shield 11c is formed.

e) On the mask pattern M3 and the magnetic shield 11c, there is fabricated a stacked film 20g (antiferromagnetic film 18b, magnetic layer 19a, nonmagnetic layer 15h, magnetic layer 19b) (see FIG. 23).

Figure 24:
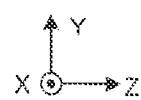
Figure 24:
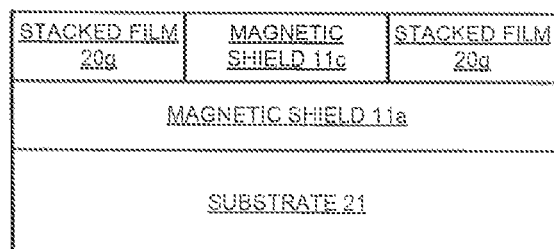

At the outset of fabrication of the stacked film 20g, a nonmagnetic layer such as of Ta may be stacked. When the nonmagnetic layer is stacked at the outset, this nonmagnetic layer is inserted between a side surface of the magnetic shied 11c and side surfaces of the antiferromagnetic layer 18c, the magnetic layer 19a, the nonmagnetic layer 15h, and the magnetic layer 19b, and between the magnetic shield 11a and the antiferromagnetic layer 18b. A film thickness in the Y axis direction of this nonmagnetic layer is preferable to be 1 nm or more to 4 nm or less.

f) The mask pattern M3 and the stacked film 20g on the mask pattern M3 are removed by a lift-off method, for example (see FIG. 24).

Thereafter, planarization is carried out by CMP or the like so that an upper surface of the stacked film 20g (an upper surface of the magnetic layer 19b) and an upper surface of the magnetic shield 11c become even.

Figure 25:
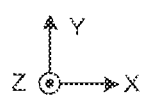
Figure 25:
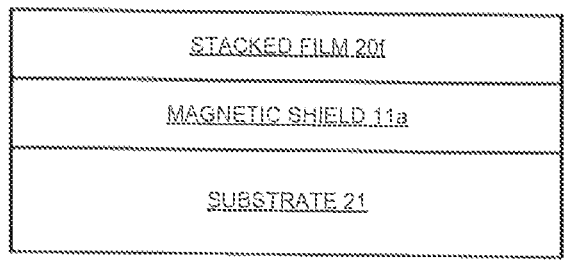

(2) Formation of Stack 20b (Magnetoresistive Effect Element 30b) (See FIG. 25)

A stack 20b (a magnetoresistive effect element 30) is formed on the magnetic shield 11c.

On the magnetic shield 11c, a stacked film 20f to be the stack 20b (the magnetoresistive effect element 30b) is formed by sputtering, for example (see FIG. 25).

The stack film 20f includes, as shown in FIG. 5A and FIG. 5B, a pinned layer 12, a nonmagnetic layer 15a, a free layer 14a, a gap adjusting layer 16, a free layer 14b, a nonmagnetic layer 15g, and a magnetic layer 19, for example. An entire thickness in the Y axis direction of the stack film 20f is 19 nm, for example.

A fabrication method after FIG. 25 will be omitted, since fabrication can be carried out by a method similar to a fabrication method after FIG. 10.

Examples

Hereinafter, examples and comparative examples will be described.

Comparative Example 1

Corresponding to First Comparative Example

First, there is described a characteristic of a magnetic head according to a comparative example 1 being a reference of a characteristic. The magnetic head according to the comparative example 1 is of magnetic head structure of the first comparative example shown in FIG. 2A and FIG. 2B. A major layer configuration of the magnetic head according to the comparative example 1 is shown in Table 1.

TABLE 1

| Layer Configuration | Material | Film Thickness |
| --- | --- | --- |
| Pinned Layer 12x | Ta/NiCr/IrMn/ CoFe/Ru/CoFe | 2 nm/1 nm/6 nm/ 2.2 nm/0.5 nm/2.2 nm |
| Nonmagnetic Layer 15ax | MgO | 0.8 nm |
| Free Layer 14x | CoFeB | 5 nm |
| Nonmagnetic Cap Layer CP | Ru | 5 nm |
| Nonmagnetic Layer 15dx | Ru | 1 nm |
| Magnetic Shield 11b | NiFe | 1 µm |
| Magnetic Shield 11a | NiFe | 1 µm |
| Side Shield SS | NiFe | 23 nm |

By using the magnetic head of the comparative example 1, a recording density in a TPI direction and a recording density in a BPI direction are found, respectively.

With regard to the recording density in the TPI direction, PW50 is calculated from a track profile in the TPI direction, and from a value thereof, a TPI recording density reachable by only a reproducing head is calculated. This value indicates a TPI recording density potential by only the reproducing head.

Further, with regard to the BPI direction, BER calculation is carried out by using an isolated reproduced waveform which has been calibrated by simulation and a reachable user density (UD) is calculated.

Consequently, the TPI recording density is 705 kTPI and the BPI recording density (UD) is 1.3.

In the following examples and comparative examples, with the above result being a reference value, review is carried out in a TPI gain and a BPI gain from the comparative example.

Comparative Example 2

Corresponding to Second Comparative Example

A characteristic of a magnetic head according to a comparative example 2 will be described. A layer configuration of the magnetic head according to the comparative example 2 is of magnetic head structure of the second comparative example shown in FIG. 3A and FIG. 3B. A major layer configuration of the magnetic head according to the comparative example 2 is shown in Table 2.

TABLE 2

| Layer Configuration | Material | Film Thickness |
| --- | --- | --- |
| Pinned Layer 12y | Ta/NiCr/IrMn/ CoFe/Ru/CoFe | 2.2 nm/2 nm/8 nm/ 2.5 nm/0.4 nm/2.5 nm |
| Nonmagnetic Layer 15ay | MgO | 1 nm |
| Free Layer 14ay | CoFeB | 4 nm |
| Nonmagnetic Layer 15by | Ru | 0.4 nm |
| Free Layer 14by | CoFeB | 4 nm |
| Antiferromagnetic Layer 18y | IrMn | 17 nm |
| Magnetic Shield 11b | NiFe | 1 µm |
| Magnetic Shield 11a | NiFe | 1 µm |
| Side Shield SS | NiFe | 43 nm |

A TPI recording density and a BPI recording density are calculated similarly to in the comparative example 1, and each gain thereof to the comparative example 1 is figured out. Results are TPI gain: −6% and BPI gain: +10%.

Example 1

Corresponding to Second Embodiment

A characteristic of a magnetic head according to an example 1 will be described. A layer configuration of the magnetic head according to the example 1 is the same as that of the second embodiment. A major layer configuration of the magnetic head according to the example 1 is shown in Table 3.

TABLE 3

| Layer Configuration | Material | Film Thickness |
| --- | --- | --- |
| Pinned Layer 12 | Ta/NiCr/IrMn/ CoFe/Ru/CoFe | 2.2 nm/2 nm/8 nm/ 2.5 nm/0.4 nm/2.5 nm |
| Nonmagnetic Layer 15a | MgO | 1 nm |
| Free Layer 14a | CoFeB | 4 nm |
| Gap Adjusting Layer 16 | Ru/CoFe/Ru/ CoFe/Ru | 0.4 nm/1 nm/0.4 nm/ 1 nm/0.4 nm |
| Free Layer 14b | CoFeB | 4 nm |
| Nonmagnetic Layer 15g | Ru | 0.4 nm |
| Magnetic Layer 19 | CoFe | 1 nm |
| Antiferromagnetic Layer 18a | InMn | 5 nm |
| Magnetic Shield 11b | NiFe | 1 µm |
| Magnetic Shield 11a | NiFe | 1 µm |
| Side Shield SS | NiFe | 29 nm |

A magnetic volume fraction of the free layers 14a, 14b is 1.0. A distance between the free layers 14a, 14b in relation to the bit length is 0.625. Further, a relation of directions of magnetization of the free layer 14b and the side shield SS is of antiparallel direction.

A TPI recording density and a BPI recording density are calculated similarly to in the comparative example 1, and each gain thereof to the comparative example 1 is figured out. Results are TPI gain: +2% and BPI gain: +8%.

From results of the comparative example 1, the comparative example 2, and the example 1, it is found that in the example 1 both TPI gain and BPI gain are larger than in the comparative example 1 and the comparative example 2 and that the recording density is improved.

Example 2

Corresponding to Third Embodiment

A characteristic of a magnetic head according to an example 2 will be described. A layer configuration of the magnetic head according to the example 2 is the same as that of the third embodiment. A major layer configuration of the magnetic head according to the example 2 is shown in Table 4.

TABLE 4

| Layer Configuration | Material | Film Thickness |
| --- | --- | --- |
| Pinned Layer 12 | Ta/NiCr/CoFe/ Ru/CoFe | 2.2 nm/2 nm/2.5 nm/ 0.4 nm/2.5 nm |
| Nonmagnetic Layer 15a | MgO | 1 nm |
| Free Layer 14a | CoFeB | 4 nm |
| Gap Adjusting Layer 16 | Ru/CoFe/Ru/ CoFe/Ru | 0.4 nm/1 nm/0.4 nm/ 1 nm/0.4 nm |
| Free Layer 14b | CoFeB | 4 nm |
| Nonmagnetic Layer 15g | Ru | 0.4 nm |
| Magnetic Layer 19 | CoFe | 1 nm |
| Antiferromagnetic Layer 18b | InMn | 8 nm |
| Antiferromaonetic Layer 18a | InMn | 5 nm |
| Magnetic Shield 11c | NiFe | 12 nm |
| Magnetic Shield 11b | NiFe | 1 μm |
| Magnetic Shield 11a | NiFe | 1 μm |
| Side Shield SS | NiFe | 26 nm |

A magnetic volume fraction of the free layers 14a, 14b is 1.0. A distance between the free layers 14a, 14b in relation to the bit length is 0.625. Further, a relation between directions of magnetization of the free layer 14b and the side shield SS is of antiparallel direction.

A TPI recording density and a BPI recording density are calculated similarly to in the comparative example 1, and each gain thereof to the comparative example 1 is figured out. Results are TPI gain: −4% and BPI gain: +10%.

From results of the comparative example 1, the comparative example 2, and the example 2, it is found that in the example 2 both TPI gain and a gain in the BPI direction are larger than in the comparative example 1 and the comparative example 2 and that the recording density is improved.

Example 3

Indicating Distance Dependence Between Free Layers in Second Embodiment

A characteristic of a magnetic head according to an example 3 will be described.

A layer configuration of the magnetic head according to the example 3 is the same as that of the second embodiment. However, by changing the number n of stacks of gap adjusting layers, a distance between a free layer 14a and a free layer 14b in relation to the bit length is changed in a range of 0.4 to 0.8.

A magnetic volume fraction of the free layers 14a, 14b is 1.0. A relation between directions of magnetization of the free layer 14b and the side shield SS is of antiparallel direction.

A TPI recording density and a BPI recording density are calculated similarly to in the comparative example 1, and a recording density gain is figured out from each gain thereof to the comparative example 1. FIG. 26 shows results of the above.

From the results of the example 3, it is found that 0.5 or more to 0.7 or less is particularly good as a distance between the free layer 14a and the free layer 14b in relation to the bit length.

Example 4

Indicating Magnetic Volume Fraction Dependence in Second Embodiment

A characteristic of a magnetic head according to an example 4 will be described.

A layer configuration of the magnetic head according to the example 4 is the same as that of the second embodiment. However, by changing values of saturation magnetic flux densities of free layers 14a, 14b, a magnetic volume fraction of the free layers 14a, 14b is changed. A relation between directions of magnetization of the free layer 14b and the side shield SS is of antiparallel direction.

A TPI recording density and a BPI recording density are calculated similarly to in the comparative example 1, and a recording density gain is figured out from each gain thereof to the comparative example 1. FIG. 27 shows results of the above.

From the results of the example 4, it is found that 1 or less or 1.4 or more is particularly good as a magnetic volume fraction of the free layer 14a and the free layer 14b.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head comprising:
   a first magnetic shield;
   a stack disposed on the first magnetic shield;
   a side shield disposed on the first magnetic shield in a manner to face a side surface of the stack;
   an antiferromagnetic layer disposed on the stack and the side shield; and
   a second magnetic shield disposed on the antiferromagnetic layer,
   wherein the stack has:
      a pinned layer disposed on the first magnetic shield, a magnetic direction thereof being fixed;
      a nonmagnetic layer disposed on the pinned layer;
      a first free layer disposed on the nonmagnetic layer, a magnetic direction thereof changing in correspondence with an external magnetic field; and
      a second free layer disposed on the first free layer, antiferromagnetically exchange coupled to the first free layer, exchange coupled to the antiferromagnetic layer, and a magnetic direction thereof changing in correspondence with the external magnetic field, and
   wherein the side shield is exchange coupled to the antiferromagnetic layer.

2. The magnetic head of claim 1,
   wherein the stack further has a second nonmagnetic layer disposed between the first free layer and the second free layer; and
   wherein the first free layer and the second free layer are antiferromagnetically exchange coupled via the second nonmagnetic layer.

3. The magnetic head of claim 1,
   wherein the stack further has a gap adjusting layer disposed between the first free layer and the second free layer, the gap adjusting layer has a plurality of second nonmagnetic layers and a plurality of magnetic layers alternately stacked; and
   wherein the first free layer and the second free layer are antiferromagnetically exchange coupled via the gap adjusting layer.

4. The magnetic head of claim 1,
wherein the pinned layer has a base layer, a second antiferromagnetic layer, a first ferromagnetic layer, a second nonmagnetic layer, and a second ferromagnetic layer stacked in sequence.

5. The magnetic head of claim 1,
wherein magnetization directions of the second free layer and the side shield are antiparallel.

6. The magnetic head of claim 1,
wherein a distance between the first free layer and the second free layer is 0.5 or more to 0.7 or less in relation to a bit length.

7. The magnetic head of claim 1,
wherein a ratio (Mst1/Mst2) of a magnetic volume Mst1 of the first free layer to a magnetic volume Mst2 of the second free layer is 1.0 or less or 1.4 or more.

8. The magnetic head of claim 1,
wherein the nonmagnetic layer includes an insulator or a nonmagnetic metal.

9. The magnetic head of claim 1,
wherein the stack further has:
a second nonmagnetic layer disposed on the second free layer; and
a second magnetic layer disposed on the second nonmagnetic layer.

10. The magnetic head of claim 1, further comprising:
a second nonmagnetic layer disposed between the side shield and the antiferromagnetic layer; and
a third magnetic layer disposed between the second nonmagnetic layer and the antiferromagnetic layer.

11. The magnetic head of claim 1, further comprising
a ferromagnetic layer disposed between the antiferromagnetic layer and the second free layer and extending to on the side shield.

12. The magnetic head of claim 1, further comprising:
a third magnetic shield and a second antiferromagnetic layer disposed side by side between the first magnetic shield and the stack.

13. The magnetic head of claim 1,
wherein the magnetic head to output a signal corresponding to a difference of changes of the magnetization directions of the first free layer and the second free layer.

14. A magnetic head assembly comprising:
the magnetic head according to claim 1;
a suspension on one end of which the magnetic head is mounted; and
an actuator arm connected to another end of the suspension.

15. A magnetic recording and reproducing apparatus comprising:
the magnetic head assembly of claim 14; and
a magnetic recording medium whose information is reproduced by using the magnetic head mounted on the magnetic head assembly.

16. A manufacturing method of a magnetic head, comprising:
forming a first magnetic shield;
forming a stack on the first magnetic shield;
forming a side shield on the first magnetic shield in a manner to face a side surface of the stack;
forming an antiferromagnetic layer on the stack and the side shield; and
forming a second magnetic shield on the antiferromagnetic layer,
wherein the stack has:
a pinned layer disposed on the first magnetic shield, a magnetic direction thereof being fixed;
a nonmagnetic layer disposed on the pinned layer;
a first free layer disposed on the nonmagnetic layer, a magnetization direction thereof changing in correspondence with an external magnetic field; and
a second free layer disposed on the first free layer, antiferromagnetically exchange coupled to the first free layer, exchange coupled to the antiferromagnetic layer, and a magnetization direction thereof changing in correspondence with the external magnetic field, and
wherein the side shield is exchange coupled to the antiferromagnetic layer.

* * * * *